(12) United States Patent
Takeuchi

(10) Patent No.: US 8,830,349 B2
(45) Date of Patent: Sep. 9, 2014

(54) IMAGE CAPTURING APPARATUS, IMAGE CAPTURING METHOD, AND PROGRAM

(75) Inventor: Yoshitaka Takeuchi, Kodaira (JP)

(73) Assignee: Canon Kabushiki Kaisha, Tokyo (JP)

(*) Notice: Subject to any disclaimer, the term of this patent is extended or adjusted under 35 U.S.C. 154(b) by 84 days.

(21) Appl. No.: 13/087,038

(22) Filed: Apr. 14, 2011

(65) Prior Publication Data

US 2011/0187892 A1    Aug. 4, 2011

Related U.S. Application Data

(63) Continuation of application No. 11/153,569, filed on Jun. 14, 2005, now abandoned.

(30) Foreign Application Priority Data

Jun. 15, 2004  (JP) ................................. 2004-177345

(51) Int. Cl.
| | |
|---|---|
| *H04N 9/73* | (2006.01) |
| *H04N 5/228* | (2006.01) |
| *H04N 5/20* | (2006.01) |
| *H04N 1/00* | (2006.01) |
| *H04N 1/60* | (2006.01) |
| *H04N 5/77* | (2006.01) |
| *H04N 5/907* | (2006.01) |
| *H04N 101/00* | (2006.01) |
| *H04N 9/804* | (2006.01) |
| *H04N 9/82* | (2006.01) |

(52) U.S. Cl.
CPC .......... *H04M 1/6027* (2013.01); *H04N 1/0044* (2013.01); *H04N 5/907* (2013.01); *H04N 1/00474* (2013.01); *H04N 1/00427* (2013.01); *H04N 1/00167* (2013.01); *H04N 2101/00* (2013.01); *H04N 9/8047* (2013.01); *H04N 1/6086* (2013.01); *H04N 1/00482* (2013.01); *H04N 5/772* (2013.01); *H04N 9/8205* (2013.01)
USPC ................... 348/223.1; 348/222.1; 348/255

(58) Field of Classification Search
USPC .......... 348/223.1, 222.1, 229.1, 225.1, 228.1, 348/207.99, 333.02, 221.1, 255, 239, 251, 348/254
See application file for complete search history.

(56) References Cited

U.S. PATENT DOCUMENTS 4,831,437 A * 5/1989 Nishioka et al. ................. 348/71
7,388,612 B2 * 6/2008 Fukui ....................... 348/333.12

(Continued)

FOREIGN PATENT DOCUMENTS

| | | |
|---|---|---|
| JP | 11-355784 A | 12/1999 |
| JP | 2003-304546 A | 10/2003 |

OTHER PUBLICATIONS

The above references were cited in a Nov. 6, 2012 Japanese Office Action, which is enclosed without an English Translation, that issued in Japanese Patent Application No. 2011-045691.

*Primary Examiner* — Ahmed A Berhan
(74) *Attorney, Agent, or Firm* — Cowan, Liebowitz & Latman, P.C.

(57) ABSTRACT

An object of this invention is to perform, for a photographed image, image processing which reflects the intention of the user without photographing again. In order to achieve this object, photographing data from an image sensor is temporarily stored in a memory, and an image of the photographing data as a result of digital development processing is displayed. When it is determined from the displayed image that the parameters of various image processes in digital development processing are not proper for the photographed image, the parameter settings are corrected again. Then, operation of reading out photographing data from the memory and performing digital development processing again is executed a necessary number of times. When an image quality intended by the photographer is obtained, the photographing data is recorded on a recording medium.

6 Claims, 23 Drawing Sheets

(56) References Cited

U.S. PATENT DOCUMENTS 7,417,671 B2 * 8/2008 Sugimori ............ 348/223.1
2001/0020978 A1 * 9/2001 Matsui et al. ............ 348/222
2004/0165094 A1 * 8/2004 Fukui ............ 348/333.12
2005/0128316 A1 * 6/2005 Sugimori ............ 348/223.1

* cited by examiner

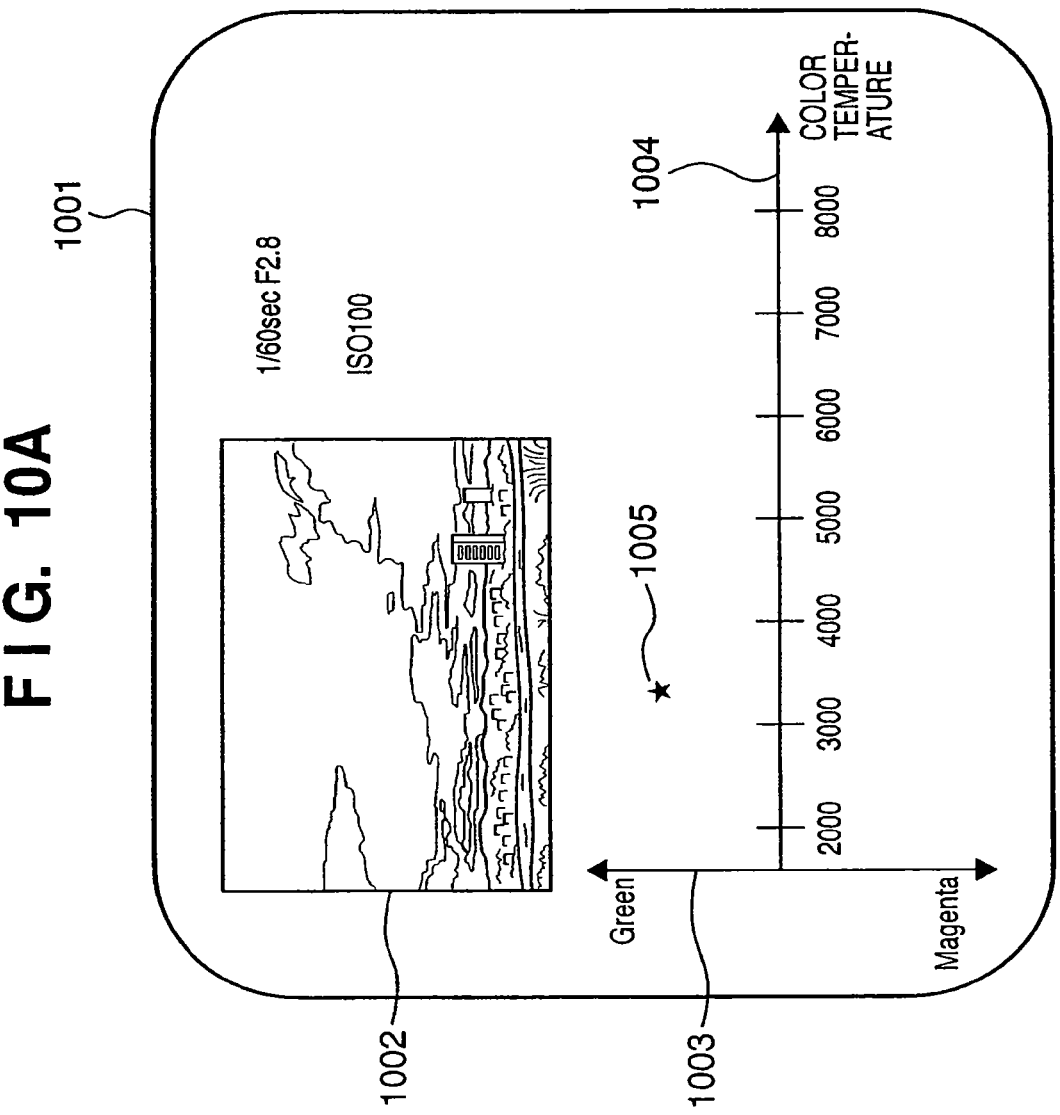

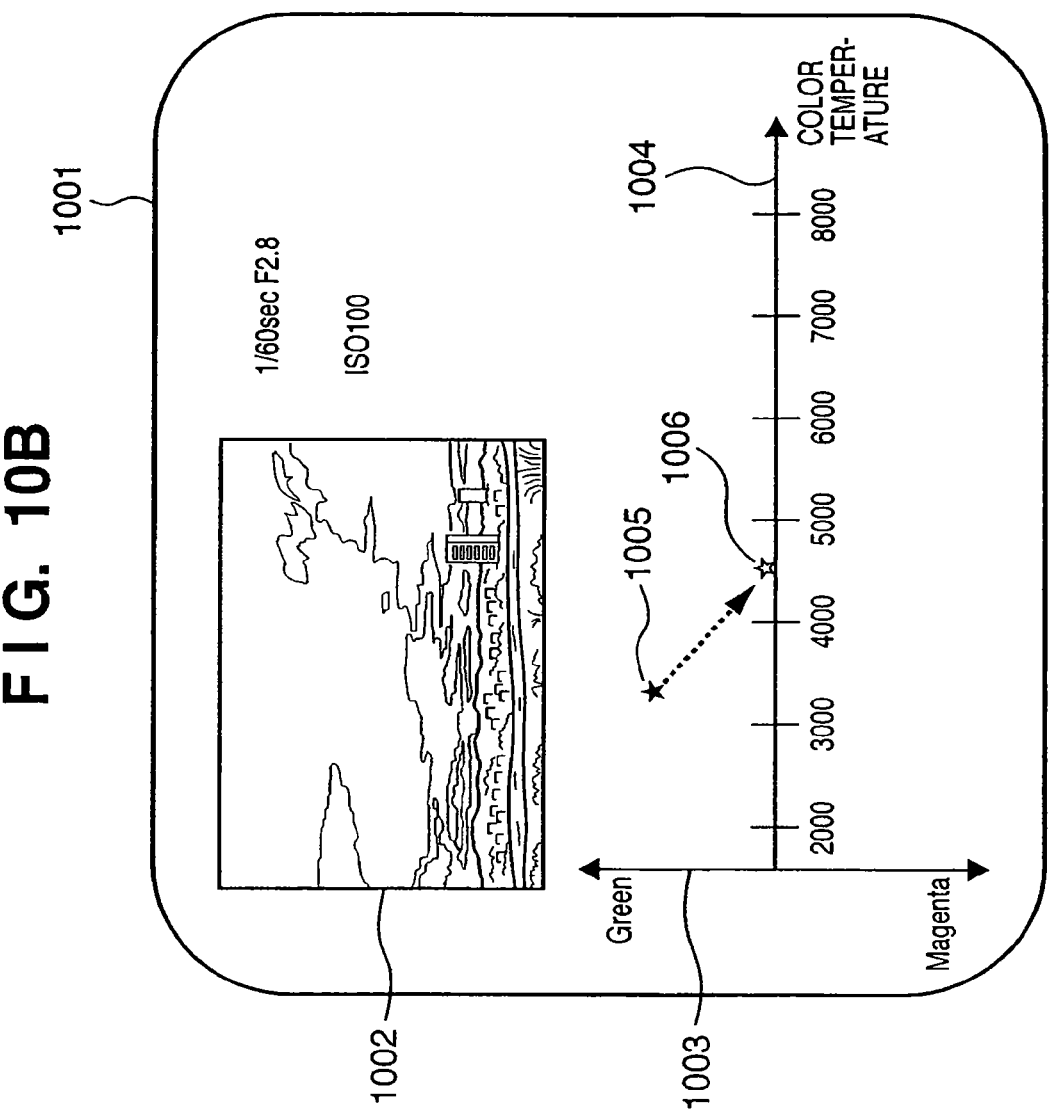

F I G. 18
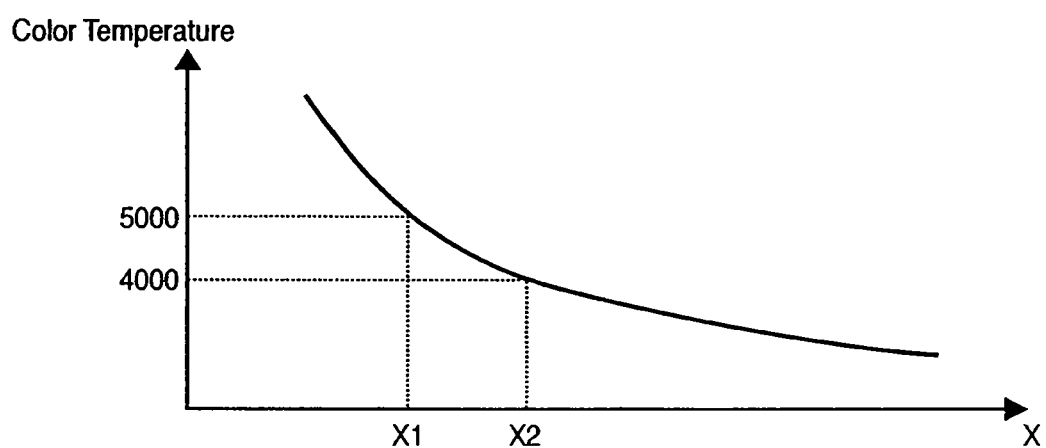

F I G. 20

| a1 | a2 | a3 |
|----|----|----|
| a4 | P  | a5 |
| a6 | a7 | a8 |

FIG. 21

| G1 | R  | G1 | R  |  |
|----|----|----|----|--|
| B  | G2 | B  | G2 |  |
| G1 | R  | G1 | R  |  |
| B  | G2 | B  | G2 |  |
|    |    |    |    |  |

IMAGE CAPTURING APPARATUS, IMAGE CAPTURING METHOD, AND PROGRAM

CROSS-REFERENCE TO RELATED APPLICATION

This application is a continuation of application Ser. No. 11/153,569, filed Jun. 14, 2005, now abandoned the entire disclosure of which is hereby incorporated by reference.

FIELD OF THE INVENTION

The present invention relates to a technique of performing digital development processing including a plurality of image processes for an image signal photographed by an image sensor, and recording the image having undergone digital development processing on a recording medium after the user confirms the image on a display.

BACKGROUND OF THE INVENTION

As digital cameras rapidly prevail in the market in recent years, the role of a photographing device is shifting from conventional cameras using color films to digital cameras. One of reasons for this trend is that the digital camera comprises a function of performing digital development processing including a plurality of image processes for an image signal photographed by an image sensor, displaying the image on an accessory image display such as a TFT monitor immediately after photographing, and allowing the user to observe the photographing result quickly. An example of such a digital camera is disclosed in, e.g., Japanese Patent Laid-Open No. 2003-134530.

In the film camera, characteristics such as sensitivity, white balance, and color development are determined by a film loaded in the camera. To the contrary, the digital camera can easily change color development of a photographed image and the like by changing the parameter settings of image processes.

FIG. 3 is a block diagram showing an example of the arrangement of a conventional digital camera having a plurality of color filters.

These color filters are primary color filters having an array of R (Red), Gr1 (Green 1), Gr2 (Green 2), and B (Blue), as shown in FIG. 21. By defining Gr on the R line as Gr1 and Gr on the B line as Gr2, Gr1 and Gr2 are regarded as different chrominance components in consideration of a case in which read amplifiers having different circuit arrangements are used.

A white balance adjustment unit 320 executes white balance adjustment processing for respective chrominance component data 304 of a digital chrominance signal which is photographed by an image sensor 301 having color filters of this array and A/D-converted by an A/D converter 303.

In this case, white balance control values for white balance processing are given as parameters of respective chrominance components. These control values are multiplied for pixels of each chrominance component and set so that the ratio of the magnitudes of chrominance signal components at the achromatic part of an image becomes R:Gr1:Gr2:B=1:1:1:1.

In auto white balance adjustment in which a white balance control value suitable for a photographed image is automatically obtained from photographed image data, for example, the following method is adopted.

The R:B ratio and (R+B):(Gr1+Gr2) ratio are calculated from adjacent R, Gr1, Gr2, and B in image data, and plotted as represented by ★s 2103 on the two-dimensional coordinate system, as shown in FIG. 19. A combination of R, Gr1, Gr2, and B falling within a coordinate range 2101 around a locus line 2102 called a black body radiation locus or CIE day light locus is defined as an achromatic region. Integral values SumR, SumGr1, SumGr2, and SumB of the respective chrominance components in the region are calculated to obtain the SumR:SumGr1:SumGr2:SumB ratio. White balance control values WbR, WbGr1, WbGr2, and WbB with which the ratio becomes 1:1:1:1 are calculated by $$WbR = (SumGr1 + SumGr2)/(2 \times R) \quad (1)$$

$$WbGr1 = (SumGr1 + SumGr2)/(2 \times Gr1) \quad (2)$$

$$WbGr2 = (SumGr1 + SumGr2)/(2 \times Gr2) \quad (3)$$

$$WbB = (SumGr1 + SumGr2)/(2 \times B) \quad (4)$$

In auto white balance adjustment, the white balance control values are determined for a color temperature of the light source that is optimal for the target image. White balance adjustment processing is done by multiplying image data of pixels of R filters by WbR, those of pixels of Gr1 filters by WbGr1, those of pixels of Gr2 filters by WbGr2, and those of pixels of B filters by WbB.

In addition to auto white balance adjustment, there are proposed preset white balance adjustment and manual white balance adjustment. In preset white balance adjustment, white balance adjustment processing is done by giving control values WbR, WbGr1, WbGr2, and WbB which are constant with respect to the color temperature of a predetermined light source. In manual white balance adjustment, an achromatic object is photographed in advance under the same light source as that used for photographing, and the white balance control values WbR, WbGr1, WbGr2, and WbB are calculated from R, Gr1, Gr2, and B data of the photographed image.

A level correction unit 322 uniquely gives, regardless of pixels, the same gain value as a parameter to the respective chrominance components of the image signal having undergone white balance processing. The respective signal components are multiplied by the gain value, thereby correcting the signal level.

A low-pass filtering unit 324 performs low-pass filtering processing for the level-corrected image signal.

The image signal is decomposed into four two-dimensional planes of R, Gr1, Gr2, and B for pixels corresponding to the respective color filters. On the plane of each color, "0"s are assigned and inserted into pixels at pixel array positions at which no color filter of the color is assigned, as shown in FIG. 22. Each two-dimensional plane undergoes filtering.

A matrix processing unit 326 executes, for a signal 325 output from the low-pass filtering unit 324, matrix operation of replacing each chrominance signal component with another chrominance signal component. For example, operation of converting (R, Gr1, Gr2, B) signal components into (Y, Cr, Cb) signal components of a luminance signal Y and chrominance signals Cr and Cb is achieved by 4×3 matrix transformation:

$$\begin{pmatrix} Y \\ C_r \\ C_b \end{pmatrix} = \begin{pmatrix} m11 & m12 & m13 & m14 \\ m21 & m22 & m23 & m24 \\ m31 & m32 & m33 & m34 \end{pmatrix} \begin{pmatrix} R \\ Gr1 \\ Gr2 \\ B \end{pmatrix} \quad (A)$$

The image signal transformed into (Y, Cr, Cb) signal components undergoes contrast control processing 328 on the basis of a gamma table. For example, a characteristic table which converts a 10-bit input image signal into an 8-bit image signal, as shown in FIG. 7, is supplied as a parameter to control the tone and contrast of the image.

Of image data 329 whose contrast is controlled on the basis of the gamma table, the Cr and Cb signals are sent to a color gain correction unit 330 which performs color processing, whereas the Y signal is sent to an edge enhancement unit 333 which performs luminance signal processing.

Of the (Y, Cr, Cb) signal components separated into the luminance and chrominance signal components, the chrominance signal components Cr and Cb undergo color gain correction processing by the color gain correction unit 330. At this time, a color gain correction value is used as a parameter, and the Cr and Cb values are multiplied by this gain to adjust the color density. This color gain correction applies the gain on the Cr-Cb coordinate system, and the color saturation can be adjusted.

A hue matrix transformation unit 332 executes 2×2 matrix operation for the chrominance signal components Cr and Cb to adjust the hue. In this case, a 2×2 matrix is given as a parameter, and the hue angle is converted by coordinate transformation on the (Cr,Cb) two-dimensional coordinate system:

$$\begin{pmatrix} Cr' \\ Cb' \end{pmatrix} = \begin{pmatrix} c11 & c12 \\ c21 & c22 \end{pmatrix} \begin{pmatrix} Cr \\ Cb \end{pmatrix} \quad (B)$$

The luminance signal component Y undergoes edge enhancement processing by the edge enhancement unit 333. Parameters in the edge enhancement unit 333 include the number of adjacent pixels to be referred to for a pixel subjected to edge enhancement, the gain value of edge enhancement, and an offset value as the threshold level used to detect an edge to be enhanced.

For example, assuming that reference pixels in edge enhancement are eight pixels (a1 to a8) around a target pixel P whose edge is to be enhanced as shown in FIG. 20, the mean value S of the nine pixels including the target pixel P is calculated:

$$S = \left(P + \sum_{k=1}^{8} ak\right)/9$$

The difference between the target pixel and the mean value S is calculated, and when the difference exceeds the offset value th, the difference is multiplied by the gain value Gain of edge enhancement and the product is added to the original target pixel P, thereby achieving edge enhancement processing:

$$P' = P + (P - S - th) \cdot \text{Gain} \quad ((P-S) \geq th)$$

With these parameters, the degree of edge enhancement processing on the image is adjusted. Edge enhancement can be made strong by a larger gain value and weak by a smaller gain value. Edge enhancement can be made weak by a larger offset value and strong by a smaller gain value.

The image signal (Y, Cr, Cb) having undergone digital development processing including various image processes is formatted by a formatting unit 309 into an image file of a general-purpose image format such as a JPEG file. The image file is recorded by an image recording unit 317 on various recording media (e.g., compact flash® memory card) removable from the camera main body.

From the above description, image processing which reflects the intention of the user of the digital camera on various photographing conditions can be realized by setting before photographing the parameters of various image processes when digital development processing is executed for a photographed image. If, however, an image of an image quality which does not reflect the intention of the photographer is photographed due to a change in photographing conditions during photographing, parameters must be set again to execute photographing again. Also, whether set parameters are optimal is not known until a photographed image is confirmed, and photographing may be repeated, missing a photographing scene intended by the photographer.

SUMMARY OF THE INVENTION

The present invention has been made to overcome the conventional drawbacks, and has as its object to perform, for a photographed image, image processing which reflects the intention of the user without photographing again.

To solve the above problem and achieve the above object, according to the first aspect of the present invention, an image capturing apparatus is comprising an image sensing device which senses an object image, a first storage device which stores a second image signal generated by performing predetermined processing for a first image signal output from the image sensing device, an image processing device which performs image processing for the second image signal to generate a third image signal, a display device which displays the third image signal, a second storage device which stores the third image signal, a changing device which changes a parameter for the image processing of the image processing device, and a recording instruction device which issues an instruction to read out the third image signal from the second storage device and record the third image signal on a recording medium, wherein every time the parameter is changed by the changing device, the second image signal is read out from the first storage device and undergoes the image processing by the image processing device in accordance with the changed parameter to newly generate a third image signal, the third image signal is displayed on the display device and also stored in the second storage device, and a desired third image signal is read out from the second storage device and recorded on the recording medium in accordance with the instruction from the recording instruction device.

According to the second aspect of the present invention, an image capturing method is comprising an image sensing step of sensing an object image, a first storage step of storing in a first storage device a second image signal generated by performing predetermined processing for a first image signal obtained in the image sensing step, an image processing step of performing image processing for the second image signal to generate a third image signal, a display step of displaying the third image signal on a display device, a second storage step of storing the third image signal in a second storage device, a changing step of changing a parameter for the image processing in the image processing step, and a recording instruction step of issuing an instruction to read out the third image signal from the second storage device and record the third image signal on a recording medium, wherein every time the parameter is changed in the changing step, the second image signal is read out from the first storage device and undergoes the image processing step in accordance with the changed parameter to newly generate a third image signal, the third image signal is displayed on the display device and also stored in the second storage device, and a desired third image signal is read out from the second storage device and recorded on the recording medium in accordance with the instruction in the recording instruction step.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 10A is a view showing the information display in FIG. 8 which displays a development result when using the standard parameter of the white balance;

FIG. 10B is a view showing a display of the information display in FIG. 8 when the parameter of the white balance is to be switched;

FIG. 18 is a graph showing a correspondence table of the chromaticity coordinate X and color temperature for obtaining the white balance;

Figure 20:
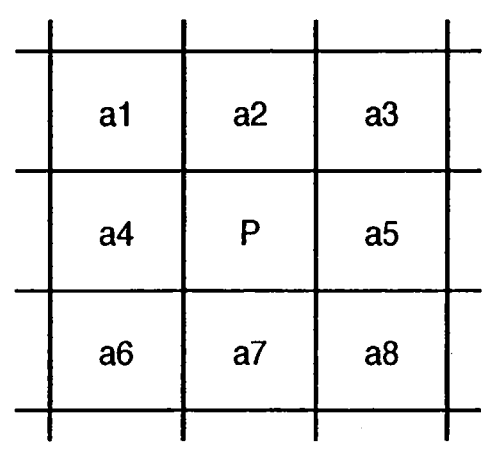

FIG. 20 is a view showing the relationship between a target pixel and adjacent pixels when edge enhancement processing is performed;

Figure 21:
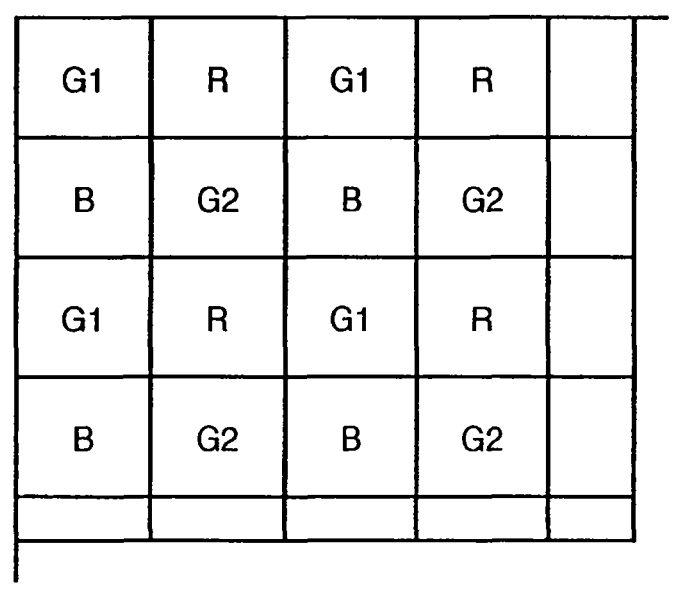

FIG. 21 is a view for explaining the array of color filters on an image sensor in the image capturing unit of a digital camera.

DETAILED DESCRIPTION OF THE PREFERRED EMBODIMENTS

Preferred embodiments of the present invention will be described below with reference to the accompanying drawings.

(First Embodiment)

Figure 1:
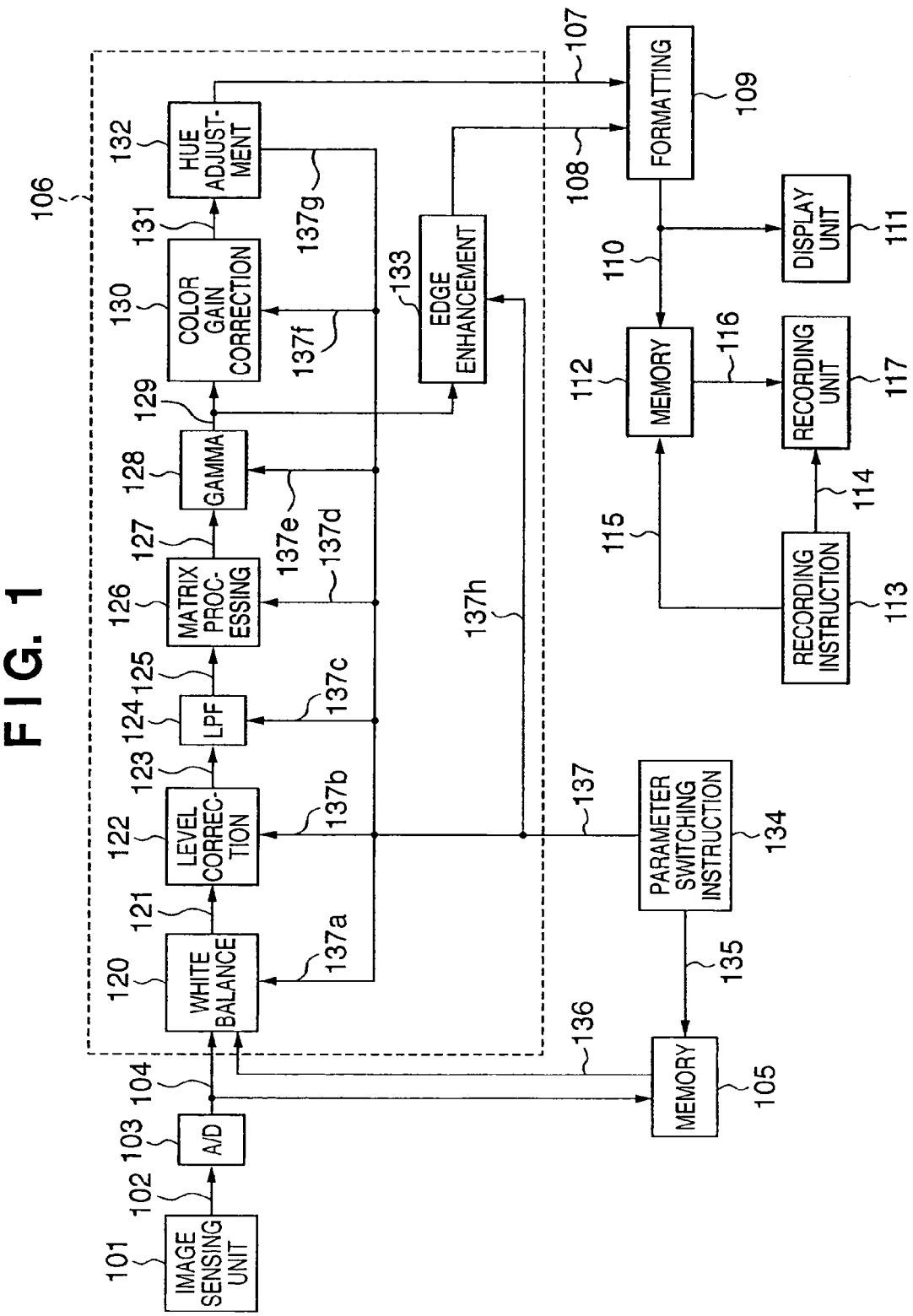
FIG. 1 is a block diagram showing the arrangement of a digital camera as an example of an image capturing apparatus according to the first embodiment of the present invention.

FIG. 1 is a block diagram showing the arrangement of a digital camera as an example of an image capturing apparatus according to the first embodiment of the present invention. In the first embodiment, a digital camera is employed as an example of the image capturing apparatus, but the image capturing apparatus according to the first embodiment can also be implemented by a digital video camera, a digital camera-equipped apparatus (including a digital camera-equipped cell phone), or the like.

In the first embodiment, the result of developing a photographed image by a digital development unit is confirmed on an image display unit, and the parameters of one or more image processes in the digital development unit are switched to develop the image again. After the user confirms on the image display unit that the redevelopment result is a desired development result, the image is recorded on a recording medium by a recording unit in response to an instruction from a recording instruction unit.

In FIG. 1, reference numeral 101 denotes an image sensor serving as an image sensing device having a plurality of color filters; 103, an A/D converter which converts a first image signal 102 output from the image sensor 101 into a second image signal 104 serving as digital data; 105, a first memory which stores the A/D-converted second image signal 104; 106, a digital development unit which performs digital development processing including a plurality of image processes; 107, a third image signal (color difference signal) which is generated by digital development processing; 109, a formatting unit which formats a signal 108 (luminance signal) into an image file; 111, an image display unit which displays filed data 110 of the third image signal; 112, a second memory which holds the filed data 110 of the third image signal; 117, a recording unit which records filed data 116 of the third image signal read out from the second memory 112; and 113, a recording instruction unit which outputs a recording instruction signal 114 for reading out the filed data of the third image signal from the second memory 112 and recording the filed data on the recording medium 117 removable from the camera.

The digital development unit 106 which performs digital development processing comprises a white balance adjustment unit 120, a level correction unit 122 which adjusts the image signal level, a low-pass filtering unit 124, a matrix operation unit 126 which converts the array of chrominance components, a gamma characteristic table conversion unit 128 which controls the contrast, a color gain correction unit 130 which multiplies chrominance components by a gain, a hue adjustment unit 132 which converts the hue, and an edge enhancement unit 133.

Reference numeral 134 denotes a parameter switching instruction unit which outputs an instruction signal 137 for switching the parameters of these image processes, and outputs an instruction signal 135 for reading out a second image signal 136 from the first memory 105 and performing development again. The parameter of the white balance adjustment unit 120 is switched by a signal 137a contained in the parameter switching instruction signal 137. The parameter of the level correction unit 122 is switched by a signal 137b; that of the low-pass filtering unit 124, by a signal 137c; that of the matrix operation unit 126, by a signal 137d; that of the gamma characteristic conversion unit 128, by a signal 137e; that of the color gain correction unit 130, by a signal 137f; that of the hue adjustment unit 132, by a signal 137g; and that of the edge enhancement unit 133, by a signal 137h.

The image signal 102 which is obtained from the image sensor 101 having color filters of four colors (R, G1, G2, B) and is made up of four chrominance components (R, G1, G2, B), similar to the prior art, is converted into the second digital image signal 104 by the A/D converter 103.

Figure 4:
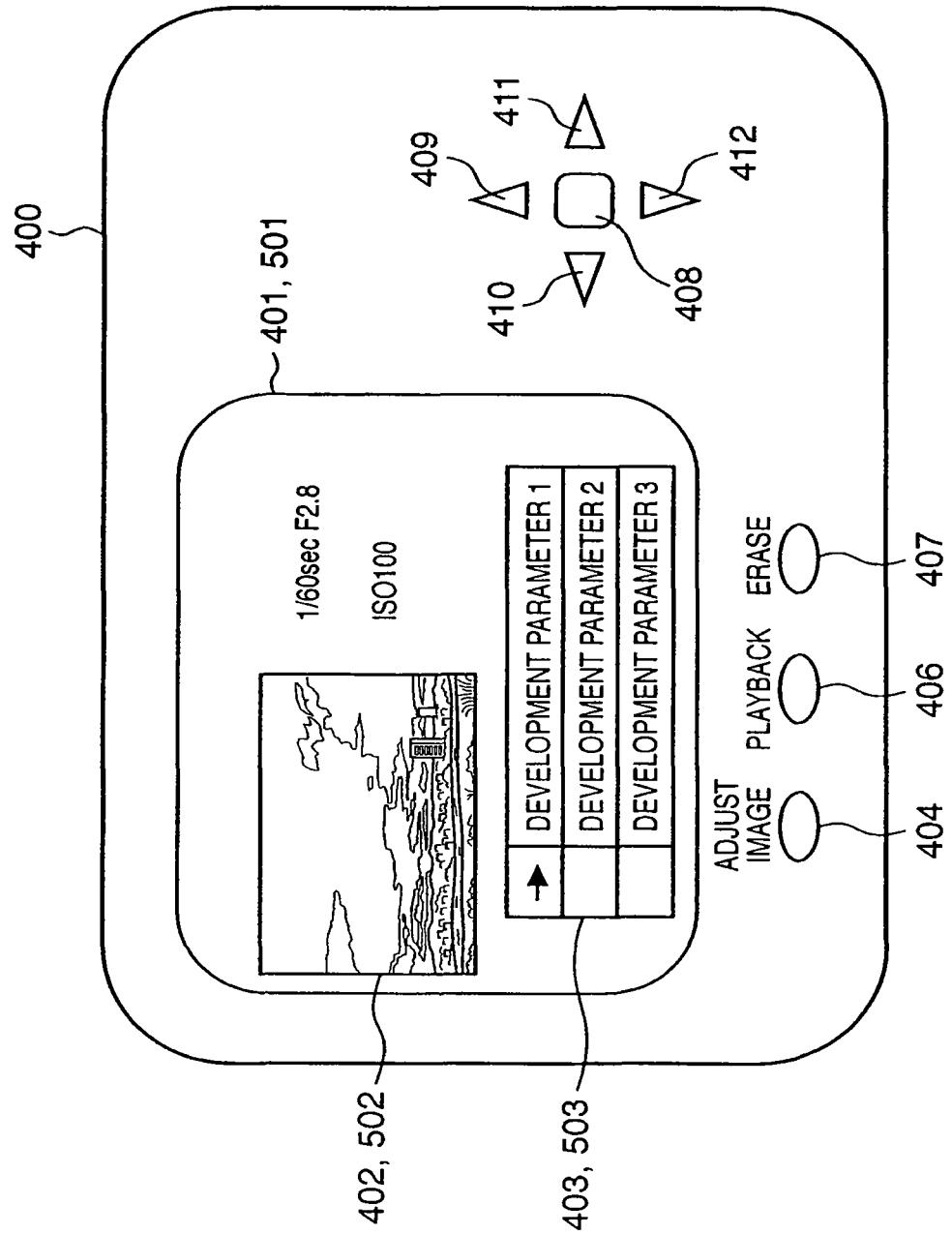
FIG. 4 is a view showing the rear surface of the digital camera according to the first embodiment of the present invention.

The digital image signal 104 is sent to the digital development unit 106 when subsequent photographing is done by pressing an image adjustment switch 404 on a rear surface 400 of the digital camera shown in FIG. 4. The digital image signal 104 is also sent to and held in the first readable memory 105 in response to the redevelopment instruction signal 135 (to be described later).

The digital development unit 106 performs the first digital development processing for the image signal 104 after photographing. At this time, parameters in various image processes are set to default values.

In the first embodiment, processes by the digital development unit 106 include various image processes by the white balance adjustment unit 120, the level correction unit 122 which adjusts the image signal level, the low-pass filtering unit 124, the matrix operation unit 126 which converts the array of chrominance components, the gamma characteristic table conversion unit 128 which controls the contrast, the color gain correction unit 130 which multiplies chrominance components by a gain, the hue adjustment unit 132 which converts the hue, and the edge enhancement unit 133. A case will be described in which redevelopment is executed by changing as a development parameter a combination of the parameters of the gamma characteristic table conversion unit 128, color gain correction unit 130, and edge enhancement unit 133.

Figure 6:
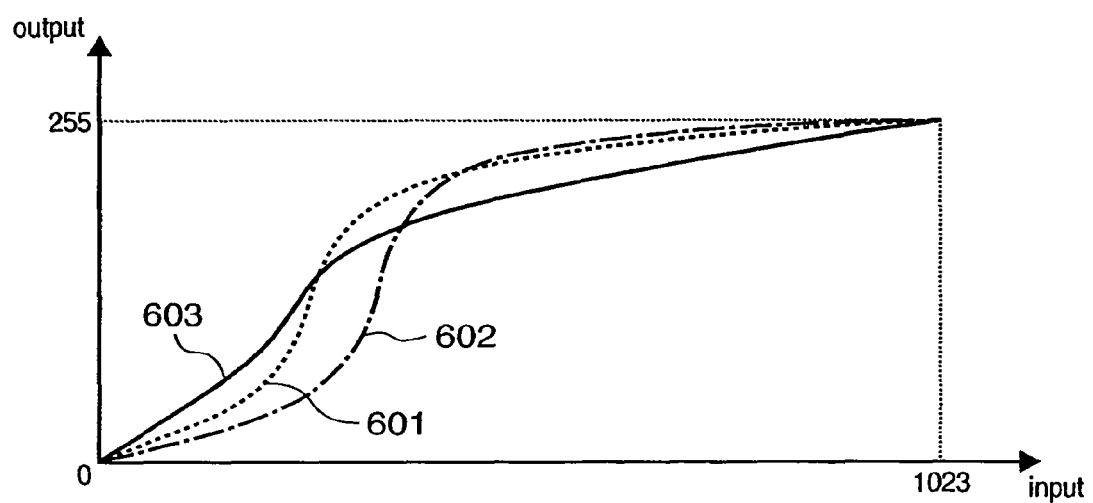
FIG. 6 is a graph showing a gamma characteristic.
Figure 7:
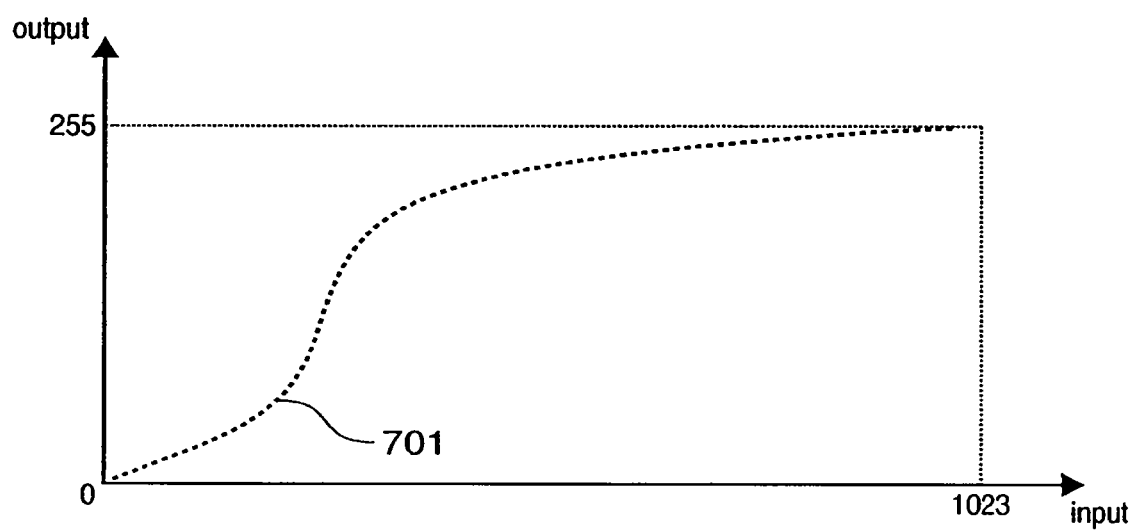
FIG. 7 is a graph showing a gamma characteristic.

FIG. 6 is a graph showing a gamma characteristic table according to the first embodiment. The abscissa represents a 10-bit input level of the processing unit, and the ordinate represents an 8-bit output level.

The curve of a table 602 exhibits a characteristic for outputting an image of a high contrast with respect to a default table 601. The curve of a table 603 exhibits a characteristic for outputting an image of a low contrast. The gamma characteristic table as a parameter is switched between the three tables "default", "high contrast", and "low contrast" in response to the parameter switching instruction command 137e.

The color gain correction unit 130 has a default color gain of x1.0, and multiplies chrominance components by 1.2 to increase the color saturation of a development result in a process of high color density and by 0.8 to decrease the color saturation of a development result in a process of low color density. The color gain correction table as a parameter is switched between the three tables "default", "high color density", and "low color density" in accordance with the parameter switching instruction command 137f.

The edge enhancement unit 133 has a default gain value of x1.0 in edge enhancement described in the prior art, and changes the degree of edge enhancement to x2.0 for strong edge enhancement and x0.0 for weak edge enhancement. The offset value is set to 4.0 as a default value, and 2.0 as a setting for strong edge enhancement. The edge enhancement table as a parameter is switched between the three tables "default" (gain value=1.0, offset value=4.0), "strong" (gain value=2.0, offset value=2.0), and "weak (edge enhancement OFF)" (gain value=0.0, offset value=arbitrary value) in accordance with the parameter switching instruction command 137h.

By combining these three image processing tables, a combination of "gamma characteristic table→default", "color gain correction table→default", and "edge enhancement table→default" is defined as "development parameter 1". Also, a combination of "gamma characteristic table→high contrast", "color gain correction table→high color density", and "edge enhancement table→strong" is defined as "development parameter 2". A combination of "gamma characteristic table→low contrast", "color gain correction table→low color density", and "edge enhancement table→weak (edge enhancement OFF)" is defined as "development parameter 3".

Characteristic operation of the first embodiment will be explained.

As described above, when photographing is done by pressing the image adjustment switch 404 on the rear surface of the digital camera shown in FIG. 4, the image data 104 in FIG. 1 undergoes digital development processing by the digital development unit 106 and at the same time is sent to and held in the first memory 105. The digital development unit 106 executes the first digital development processing at "development parameter 1", i.e., in the default parameter setting state after photographing.

At this time, the third image signals 107 (color difference signal) and 108 (luminance signal) as development results are formatted into a JPEG file by the formatting unit 109, and sent to the second memory 112.

Figure 5:
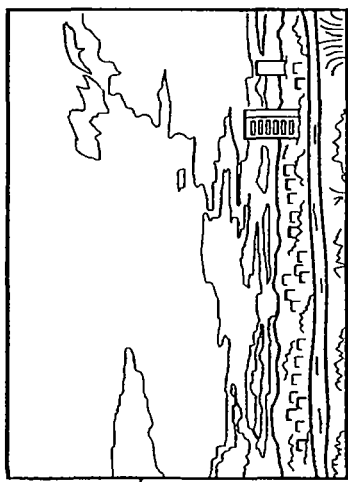
FIG. 5 is a view showing an information display in FIG. 4.

The JPEG-filed third image signals are also sent to the display unit 111, and a development result image 502 is displayed on a display unit 501 together with a development parameter selection table 503, as shown in FIG. 5.

By pressing a cross key 412 on the rear surface of the camera shown in FIG. 4, the development parameter to be selected is switched from "development parameter 1" to "development parameter 2". With this operation, the switching instruction unit 134 in FIG. 1 outputs the parameter switching instruction signal 137. The parameter setting value of the gamma characteristic table is switched from "default" to "high contrast" by the signal 137e, that of the color gain correction unit is switched from "default" to "high color density" by the signal 137f, and that of the edge enhancement unit is switched from "default" to "strong" by the signal 137h.

The second image signal stored in the first memory is read out in response to the redevelopment instruction signal 135 output from the switching instruction unit 134, and undergoes digital development processing again by the digital development unit 106.

The redeveloped third image signals 107 (color difference signal) and 108 are formatted into a JPEG file by the formatting unit 109. The filed image signal 110 is sent to the second memory 112, and written over the image file having undergone digital development processing at "development parameter 1" or stored in another area. At the same time, the filed image signal 110 is sent to the display unit 111, replaces image data of the digital development processing result at "development parameter 1", and is displayed as image data of the digital development processing result at "development parameter 2".

By pressing the cross key 412 on the rear surface of the camera shown in FIG. 4, the development parameter to be selected is switched from "development parameter 2" to "development parameter 3". With this operation, the switching instruction unit 134 in FIG. 1 outputs the parameter switching instruction signal 137. The parameter setting value of the gamma characteristic table is switched from "high contrast" to "low contrast" by the signal 137e, that of the color gain correction unit is switched from "high color density" to "low color density" by the signal 137f, and that of the edge enhancement unit is switched from "strong" to "weak (edge enhancement OFF)" by the signal 137h. Similar to the above case, digital development processing is performed again, and image data of the development result at "development parameter 3" is stored in the second memory 112 and displayed on the image display unit 111 instead of the image data at "development parameter 2".

By pressing the cross key 412 on the rear surface of the camera shown in FIG. 4, the development parameter is returned to the default state of development at "development parameter 1".

Also, by pressing a cross key 409 on the rear surface of the camera shown in FIG. 4, the development parameter can be switched in a reverse order.

By switching the development parameter, the camera user observes an image 402 of a digital development processing result that appears on the image display unit 111, and he selects a desired development parameter and presses a parameter selection button 408 shown in FIG. 4. With this operation, the recording instruction unit 113 outputs the recording instruction signal 114, and data of the image file of a digital development processing result at the selected development processing is read out from the second memory 112 and recorded on the recording medium 117.

By switching the development parameter in this manner, the camera user compares on the image 402 displayed on a monitor 401 the development result of "development parameter 1" as a default setting, the development result of "development parameter 2" at which a photographed image of a higher contrast, higher color density, and stronger edge enhancement in comparison with the default settings can be directly used without any post-processing, and the development result of "development parameter 3" at which an image of a lower contrast, lower color density, and no edge enhancement in comparison with the default setting can be used as a material at a high degree of freedom of post-processing. The camera user can select and record an optimal image.

Even if an image of an image quality which does not reflect the intention of the photographer is photographed due to a change in photographing conditions during photographing, the development parameter can be switched and set again to perform digital development processing. Whether the set parameter is optimal can be easily confirmed, photographing need not be repeated, and an optimal photographing result can always be implemented without missing a photographing scene intended by the photographer.

In the first embodiment, the development parameter is a combination of the gamma characteristic table, color gain correction, and edge enhancement processing. In addition to this, the color development characteristic of the image of a development result can also be switched using the white balance adjustment unit 120, matrix operation unit 126, and hue adjustment unit 132. Exposure can also be corrected using the level correction unit 122, or the image quality can also be switched by switching the characteristic of the low-pass filtering unit 124.

(Second Embodiment)

The second embodiment of the present invention will be described below.

Figure 2:
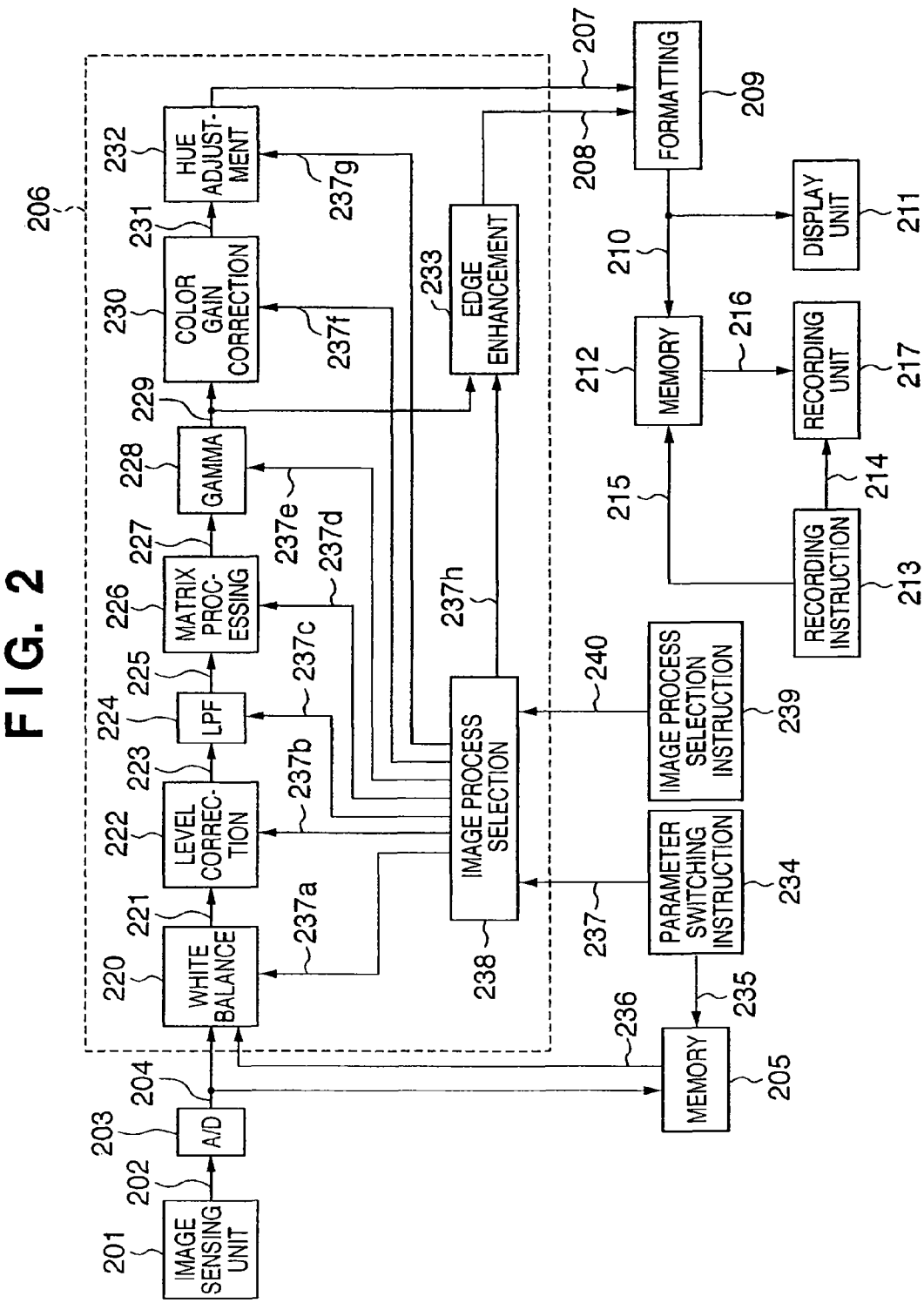
FIG. 2 is a block diagram showing the arrangement of a digital camera as an example of an image capturing apparatus according to the second embodiment of the present invention.
Figure 3:
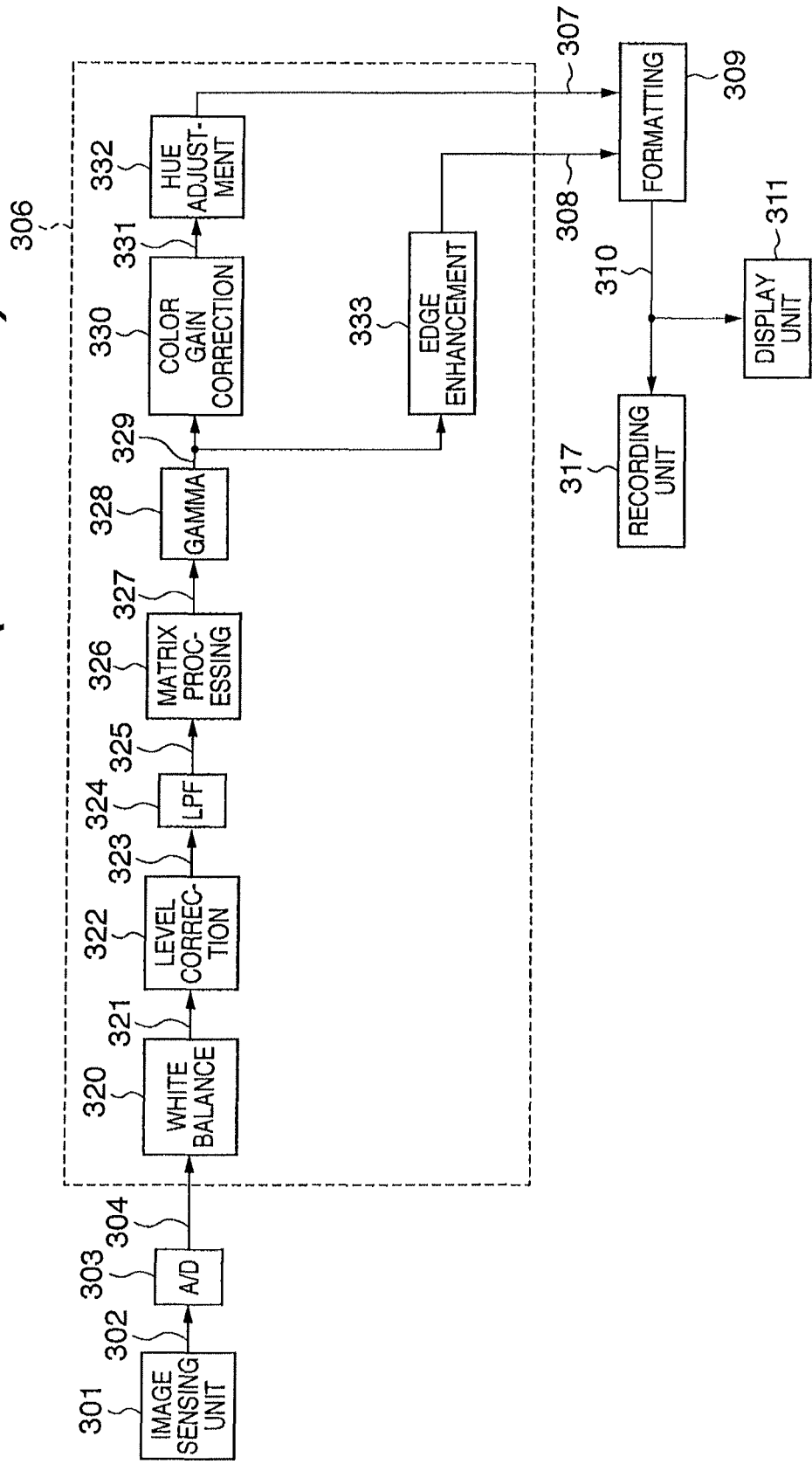
FIG. 3 is a block diagram showing an example of the arrangement of a conventional digital camera.

FIG. 2 is a block diagram showing the arrangement of a digital camera as an example of an image capturing apparatus according to the second embodiment of the present invention. In the second embodiment, a digital camera is employed as an example of the image capturing apparatus, but the image capturing apparatus according to the second embodiment can also be implemented by a digital video camera, a digital camera-equipped apparatus (including a digital camera-equipped cell phone), or the like.

In the second embodiment, the result of developing a photographed image by a digital development unit is confirmed on an image display unit, one of a plurality of types of image processes in the digital development unit is selected, and the parameters of the selected process are switched to perform development again. After the user confirms on the image display unit that the redevelopment result is a desired development result, the result is recorded on a recording medium by a recording unit in accordance with an instruction from a recording instruction unit.

In FIG. 2, reference numeral 201 denotes an image sensor serving as an image sensing device having a plurality of color filters; 203, an A/D converter which converts a first image signal 202 output from the image sensor 201 into a second image signal 204 serving as digital data; 205, a first memory which stores the second image signal 204; 206, a digital development unit which performs digital development processing including a plurality of image processes; 209, a formatting unit which formats, into an image file, third image signals 207 (color difference signal) and 208 (luminance signal) which are generated by digital development processing; 211, an image display unit which displays filed data 210 of the third image signals; 212, a second memory which holds the filed data 210 of the third image signals; 217, a recording unit which records filed data 216 of the third image signals read out from the second memory 212; and 213, a recording instruction unit which outputs a recording instruction signal 214 for reading out the filed data of the third image signals from the second memory 212 and recording the filed data on the recording medium 217 removable from the camera.

The digital development unit 206 which performs digital development processing comprises a white balance adjustment unit 220, a level correction unit 222 which adjusts the image signal level, a low-pass filtering unit 224, a matrix operation unit 226 which converts the array of chrominance components, a gamma characteristic table conversion unit 228 which controls the contrast, a color gain correction unit 230 which multiplies chrominance components by a gain, a hue adjustment unit 232 which converts the hue, and an edge enhancement unit 233.

Reference numeral 239 denotes an image process selection instruction unit which outputs an instruction signal 240 for selecting from these image processes an image process whose parameters are to be switched; 238, an image process selection unit which selects in accordance with the selection instruction signal 240 an image process whose parameters are to be switched; and 234, a parameter switching instruction unit which outputs an instruction signal 237 for switching parameters, and outputs an instruction signal 235 for reading out a second image signal 236 from the first memory 205 and performing redevelopment.

The parameter of the white balance adjustment unit 220 is switched by a signal 237a contained in the parameter switching instruction signal 237. The parameter of the level correction unit 222 is switched by a signal 237b; that of the low-pass filtering unit 224, by a signal 237c; that of the matrix operation unit 226, by a signal 237d; that of the gamma characteristic conversion unit 228, by a signal 237e; that of the color gain correction unit 230, by a signal 237f; that of the hue adjustment unit 232, by a signal 237g; and that of the edge enhancement unit 233, by a signal 237h.

The image signal 202 which is obtained from the image sensor 201 having color filters of four colors (R, G1, G2, B) and is made up of four chrominance components (R, G1, G2, B), similar to the prior art, is converted into the second digital image signal 204 by the A/D converter 203.

Figure 8:
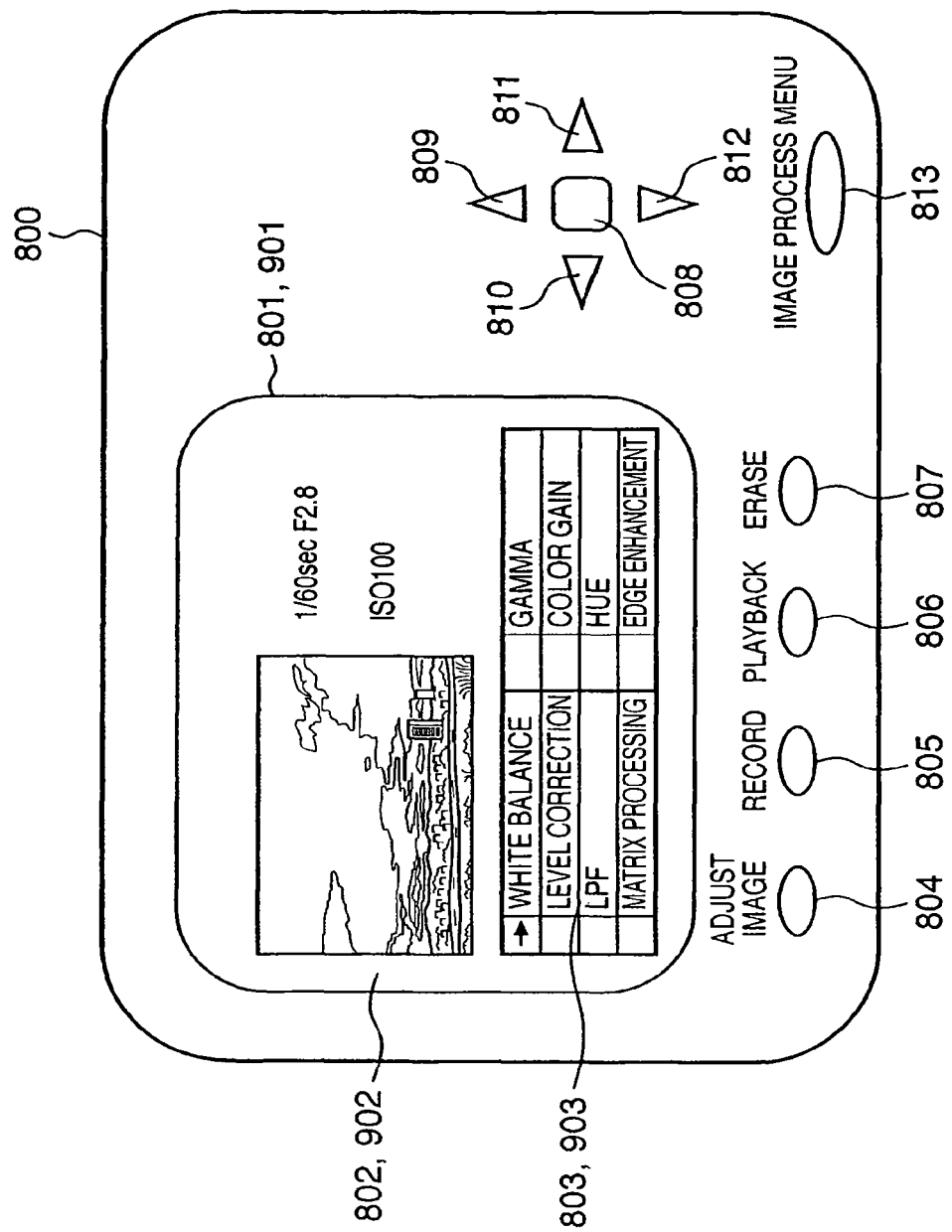
FIG. 8 is a view showing the rear surface of the digital camera according to the second embodiment of the present invention.
Figure 9:
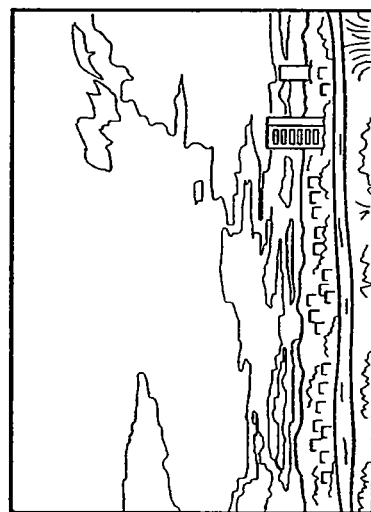
FIG. 9 is a view showing an information display in FIG. 8 which displays an image process menu.

The digital image signal 204 is sent to the digital development unit 206 when subsequent photographing is done by pressing an image adjustment switch 804 on a rear surface 800 of the digital camera shown in FIG. 8. The digital image signal 204 is also sent to and held in the first readable memory 205 in response to the redevelopment instruction signal 235 (to be described later).

The digital development unit 206 performs the first digital development processing for the image signal 204 after photographing. At this time, parameters in various image processes are set to default values.

In the second embodiment, processes by the digital development unit 206 include various image processes by the white balance adjustment unit 220, the level correction unit 222 which adjusts the image signal level, the low-pass filtering unit 224, the matrix operation unit 226 which converts the array of chrominance components, the gamma characteristic table conversion unit 228 which adjusts the contrast, the color gain correction unit 230 which multiplies chrominance components by a gain, the hue adjustment unit 232 which converts the hue, and the edge enhancement unit 233. An image process menu switch 813 in FIG. 8 is pressed before or after photographing to display the types of image processes on the display screen. The type of image process is selected by pressing cross keys 809 to 812, and then a set button 808 is pressed to determine from a plurality of image processes an image process whose parameter settings are to be switched.

With this operation, the third image signals 207 (color difference signal) and 208 (luminance signal) having undergone the first digital development processing at default parameters after photographing are converted into image data of the JPEG file format by the formatting unit 209. The image signal 210 is stored in the second memory 212, and at the same time, is sent to and displayed on the display unit 211. At this time, the image display unit 211 also displays the parameter setting state of the selected image process together. The image signal 210 is a result of the first digital development processing, and the default parameter setting values of the selected image process are displayed as "standard" setting values.

Characteristic operation of the second embodiment will be explained separately for cases in which respective image processes are selected.

Of image processes, an image process of switching the parameter setting value of the white balance adjustment unit 220 will be explained.

An image process of switching the white balance parameter setting is selected from image processes in digital development processing by using the image process menu switch 813 and cross keys 809 to 812 in FIG. 8, and is determined by pressing the set button 808. Then, as shown in FIG. 10A, a display 1001 displays an image 1002 of the result of the first digital development processing at "standard" setting values, and a chromaticity coordinate value 1005 representing a point set as a white point of the white balance.

R, Gr1, Gr2, and B values serving as the basis of the chromaticity coordinate value are calculated from reciprocals of WbR, WbGr1, WbGr2, and WbB used for white balance control:

$$R 32 1/WbR \qquad (5)$$

$$Gr1=1/WbGr1 \qquad (6)$$

$$Gr2=1/WbGr2 \qquad (7)$$

$$B=1/WbB \qquad (8)$$

In order to allow the user to easily grasp the position of a white point, chromaticity coordinates X and Y are represented by the color temperature while the abscissa X (1004) represents the black body radiation locus or day light locus. In order to easily execute operation within the camera at a high speed, the Red-Blue direction, i.e., color temperature direction is given by addition/subtraction operation:

$$X=(B-R)/Yi \qquad (9)$$

The relationship between X and the color temperature is prepared in advance as an X-color temperature table as shown in FIG. 18.

Similarly, the ordinate Y (1003) is defined by an operation which represents the Green-Magenta direction:

$$Y=\{(R+B)-(Gr1+Gr2)\}/Yi \qquad (10)$$

Yi is used to normalize the color coordinates X and Y by the luminance component, and may be given by, e.g., the following equation defined by the NTSC standard:

$$Yi=0.299 \times R+0.587 \times (Gr1+Gr2)/2+0.144 \times B \qquad (11)$$

In FIG. 10A, the chromaticity coordinates X and Y obtained from a white balance control value used in an image process in the first digital development processing after photographing are displayed on the display 1001 together with an image of the development result. White balance adjustment at this time can adopt the control value of auto white balance adjustment, preset white balance adjustment, or manual white balance adjustment which have been described in the prior art.

Then, the photographer changes the color reproduction of an image of the digital development processing result upon white balance adjustment processing by changing the parameter setting value. For this purpose, the photographer moves the white point on the chromaticity coordinate system from the default coordinates (X,Y) to target white point coordinates (X',Y') by using the cross keys 809 to 812. In FIG. 10B, ★ represents default chromaticity coordinates (X,Y) (1005), and ☆ represents target chromaticity coordinates (X', Y') (1006). The cross keys 810 and 811 are used to move the coordinates at constant intervals in plus and minus directions along the Red-Blue (color temperature) direction. The cross keys 809 and 812 are used to move the coordinates at constant intervals in plus and minus directions along the Green-Magenta direction.

After the chromaticity coordinates are moved to a target point, the photographer presses the set button 808. Then, the parameter switching instruction unit 234 in FIG. 2 outputs a signal for reading out the second image signal 236 from the first memory 205 and the signal 237a for switching the parameter setting value, and redevelopment processing starts. As is apparent from equations (1) to (4) in the prior art, control values as new parameters in white balance adjustment processing are based on (Gr1+Gr2)/2. Hence, (Gr1+Gr2)/2=1.0 is substituted into equation (10), and (X',Y') is substituted into equations (9) and (10) to obtain an R':Gr':B' ratio corresponding to (X',Y'). Consequently, new control values WbR', WbGr1', WbGr2', and WbB' are attained as parameters of white balance adjustment processing that are changed from equations (5) to (8). Digital development processing is executed again by using these parameters, and the image file 210 of the development result is sent to and stored in the second memory 212, and displayed on the display unit 211.

By repeating this operation, the photographer confirms image data of a desired color reproduction result on the image 1002 played back on the display unit 211, and then presses a recording instruction switch 805 in FIG. 8. In response to this, the recording instruction unit 213 outputs the recording instruction signal 214, and the image file stored in the second memory 212 is sent to the recording unit 217 and recorded on the recording medium.

In this way, an image of a color reproduction desired by the photographer can be obtained by recording an image which is developed again after changing the "standard" setting values of the parameters of white balance processing operation.

In the above description, development is executed again by setting a target value of the white point of the white balance with the cross keys 809 to 812 and changing the parameter. Alternatively, an image of a redevelopment result may be displayed by performing development again after changing the white balance control value on the basis of the numerical values of the coordinates (X',Y') (1006) which are moved every time one of the cross keys 809 to 812 is pressed.

Of image processes, an image process of switching the parameter setting value of the level correction unit 222 will be explained.

Figure 11:
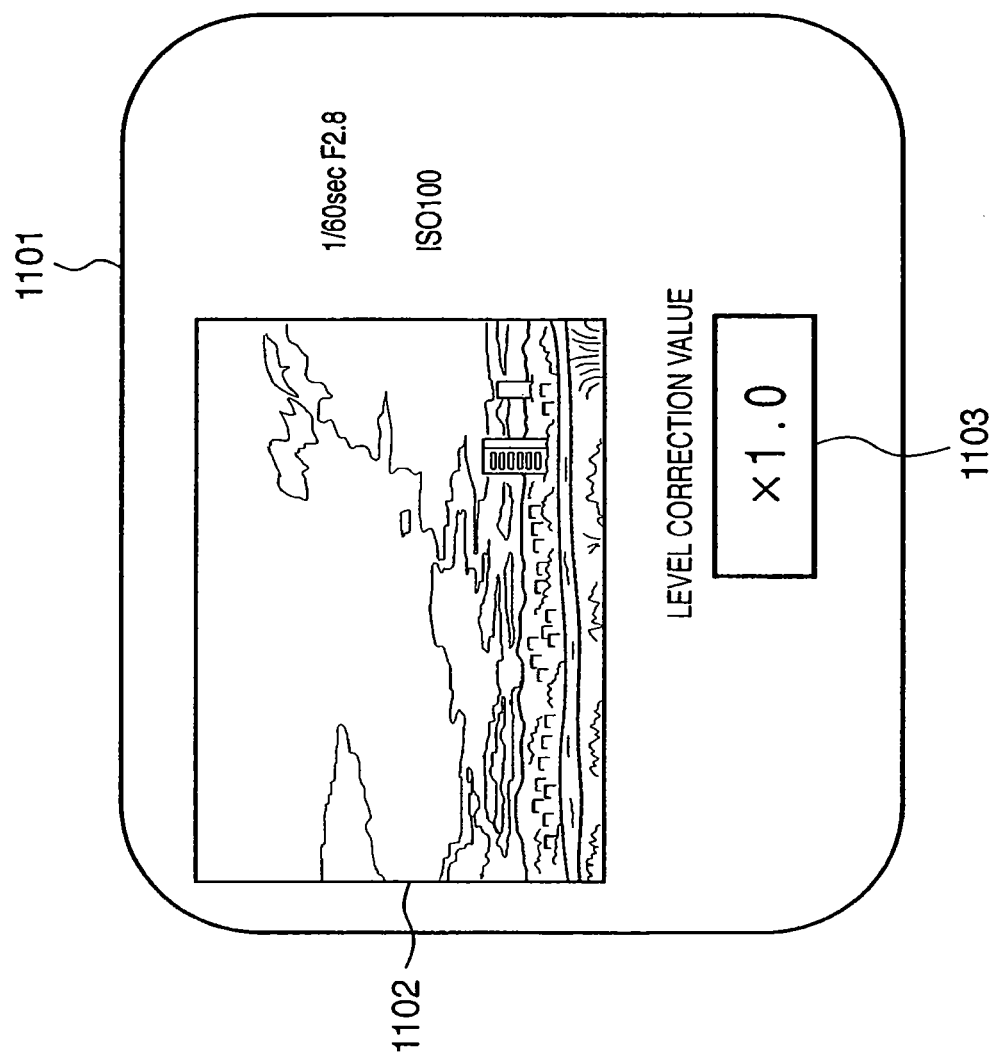
FIG. 11 is a view showing a display of the information display in FIG. 8 when the parameter of level correction is to be switched.

An image process of switching the level correction parameter setting is selected from image processes in digital development processing by using the image process menu switch 813 and cross keys 809 to 812 in FIG. 8, and is determined by pressing the set button 808. Then, as shown in FIG. 11, a display 1101 displays an image 1102 of the result of the first digital development processing at "standard" setting values, and a level correction gain value 1103. The result of the first digital development processing is the result of photographing under "standard" correct exposure, and thus "x1.0" is displayed as shown in FIG. 11.

The display sequentially changes to "x1.2", "x1.4", . . . by pressing the cross key 809, and "x0.8", "x0.6", . . . by pressing the cross key 812. When a desired gain value is displayed, the photographer presses the set button 808 to update the parameter setting value of the level correction unit 222 to the current gain value by the signal 237b. At this time, digital development processing is performed again using this parameter, and the image file 210 of the development result is sent to and stored in the second memory 212, and displayed on the display unit 211.

By repeating this operation, the photographer confirms image data of a desired exposure on the image 1102 played back on the display unit 211, and then presses the recording instruction switch 805 in FIG. 8. In response to this, the recording instruction unit 213 outputs the recording instruction signal 214, and the image file stored in the second memory 212 is sent to the recording unit 217 and recorded on the recording medium.

An image of an exposure desired by the photographer can, therefore, be attained by recording an image which is developed again after changing the "standard" setting value of the parameter of level correction processing.

In the above description, development is executed again by setting a target gain value of level correction with the cross keys 809 and 812 and changing the parameter. Alternatively, images of redevelopment results may be sequentially displayed by performing development again at a level correction gain value changed every time either the cross key 809 or 812 is pressed.

Also, the gain value is set to the notation of multiples "x1.0", "x1.2", . . . . Alternatively, exposure control based on the EV value may be adopted to express "+1.0", "+2.0", . . . for "standard"="0". For example, an image signal is multiplied by double the gain at "+1.0", and $2^{1/3}$ the gain at "+⅓".

Of image processes, an image process of switching the parameter setting value of the low-pass filtering unit 224 will be explained.

Figure 12:
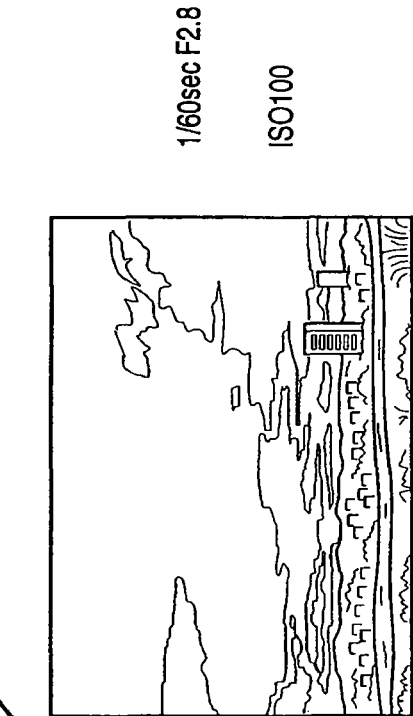
FIG. 12 is a view showing a display of the information display in FIG. 8 when the parameter of the low-pass filter characteristic is to be switched.

An image process of switching the parameter setting of the low-pass filter is selected from image processes in digital development processing by using the image process menu switch 813 and cross keys 809 to 812 in FIG. 8, and is determined by pressing the set button 808. Then, as shown in FIG. 12, a display 1201 displays an image 1202 of the result of the first digital development processing at "standard" setting values, and a low-pass filter characteristic 1203. The result of the first digital development processing exhibits that a "1-2-1" 3-tap filter is employed as "standard" in both the horizontal and vertical directions.

The display sequentially changes to "LPF2: 1-2-5-2-1 in the horizontal direction and 1-2-5-2-1 in the vertical direction" and "LPF3: 1-0-3-0-1 in the horizontal direction and 1-2-1 in the vertical direction" by pressing the cross key 812. When a desired image is obtained, the photographer presses the set button 808 to update the parameter setting value to the current low-pass filter by the signal 237c. At this time, digital development processing is performed again using this parameter, and the image file 210 of the development result is sent to and stored in the second memory 212, and displayed on the display unit 211.

By repeating this operation, the photographer confirms a desired image on the image 1202 played back on the display unit 211, and then presses the recording instruction switch 805 in FIG. 8. In response to this, the recording instruction unit 213 outputs the recording instruction signal 214, and the image file stored in the second memory 212 is sent to the recording unit 217 and recorded on the recording medium.

In this fashion, an image of a resolution desired by the photographer can be attained by recording an image which is developed again after changing the "standard" setting value of the parameter of the low-pass filter. Further, generation of a false color in an image can also be dealt with by switching the characteristic of the low-pass filter.

In the above description, development is executed again by selecting a target characteristic of the low-pass filter with the cross keys 809 and 812 and changing the parameter. Alternatively, images of redevelopment results may be sequentially displayed by performing development again with a low-pass filter characteristic changed every time either the cross key 809 or 812 is pressed.

Of image processes, an image process of switching the parameter setting value of the matrix operation unit 226 for converting the array of chrominance components will be explained.

Figure 13:
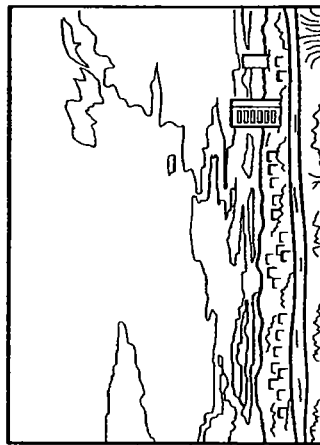
FIG. 13 is a view showing a display of the information display in FIG. 8 when the parameter of the color conversion matrix is to be switched.

An image process of switching the parameter setting of the color matrix is selected from image processes in digital development processing by using the image process menu switch 813 and cross keys 809 to 812 in FIG. 8, and is determined by pressing the set button 808. Then, as shown in FIG. 13, a display 1301 displays an image 1302 of the result of the first digital development processing at "standard" setting values. In addition, an image 1303 exhibits that the results of the first digital development processing are the results of development based on "matrix 1 (standard)".

The display sequentially changes to "matrix 2", "matrix 3", and "matrix 4" by pressing the cross key 812. As each of the matrix tables, there is prepared a matrix table having 4×3 element values m11 to m34 so as to change color reproduction in equation (A) described in the prior art. When a desired matrix table is set, the photographer presses the set button 808 to update the parameter setting value to the current color matrix table by the signal 237d. At this time, digital development processing is performed again using this parameter, and the image file 210 of the development result is sent to and stored in the second memory 212, and displayed on the display unit 211.

By repeating this operation, the photographer confirms image data of a desired color reproduction on the image 1302 played back on the display unit 211, and then presses the recording instruction switch 805 in FIG. 8. In response to this, the recording instruction unit 213 outputs the recording instruction signal 214, and the image file stored in the second memory 212 is sent to the recording unit 217 and recorded on the recording medium.

Consequently, an image of a color reproduction desired by the photographer can be attained by recording an image which is developed again after changing the "standard" setting value of the parameter of the color matrix.

In the above description, development is executed again by selecting a target one of color matrix tables with the cross keys 809 and 812 and changing the parameter. Alternatively, images of redevelopment results may be sequentially displayed by performing development again on the basis of a color matrix table changed every time either the cross key 809 or 812 is pressed.

The numerical values m11 to m34 of the respective elements of the color matrix can also be individually selected with the cross keys 809 to 812 and set button 808 to change the magnitude of each numerical value and perform development again.

Of image processes, an image process of switching the parameter setting value of the gamma characteristic table conversion unit 228 for controlling the contrast will be explained.

Figure 14:
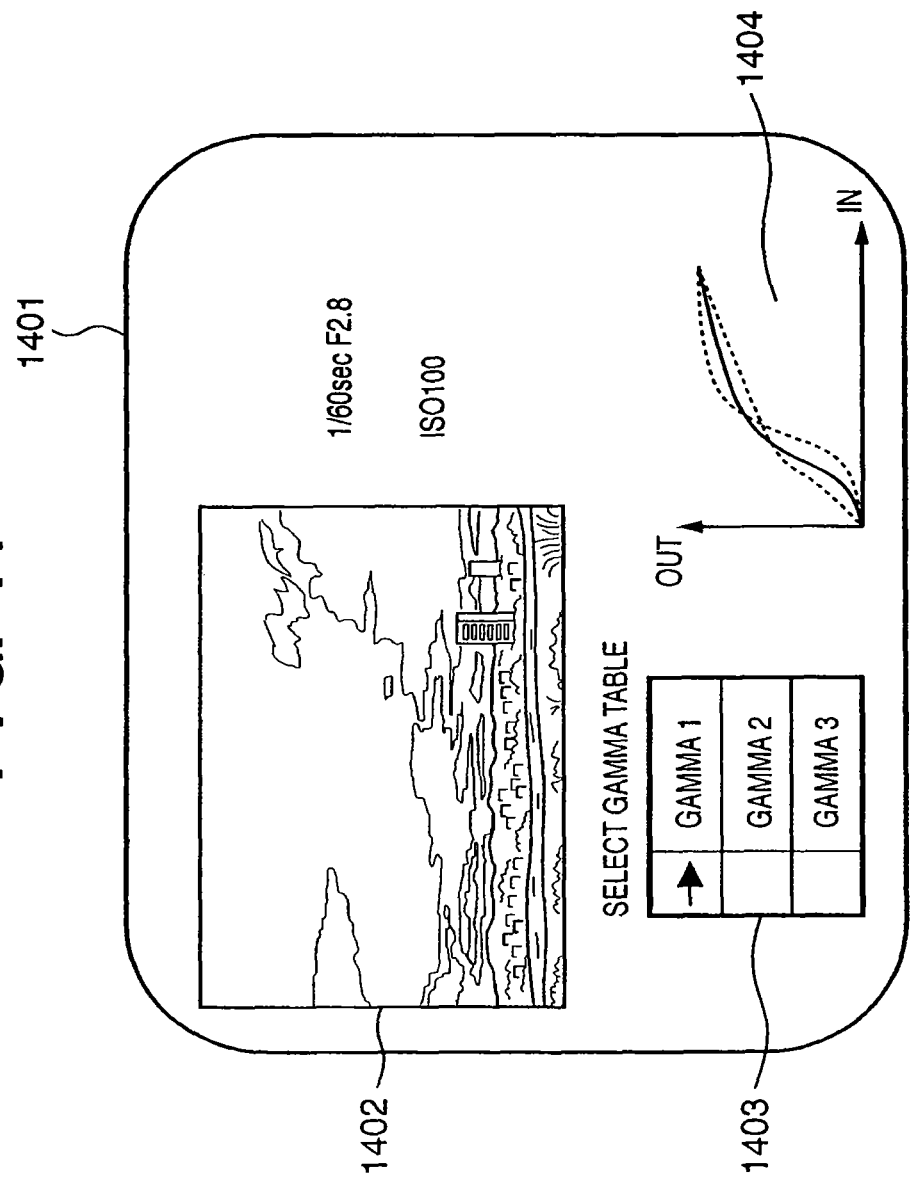
FIG. 14 is a view showing a display of the information display in FIG. 8 when the parameter of the gamma characteristic is to be switched.

An image process of switching the parameter setting of the gamma table is selected from image processes in digital development processing by using the image process menu switch 813 and cross keys 809 to 812 in FIG. 8, and is determined by pressing the set button 808. Then, as shown in FIG. 14, a display 1401 displays an image 1402 of the result of the first digital development processing at "standard" setting values, and "gamma 1 (standard)" on both a table 1403 and characteristic graph 1404.

The display sequentially changes to "gamma 2" and "gamma 3" by pressing the cross key 812. As the gamma characteristic tables, a table having a characteristic as shown in FIG. 6 is prepared. In this case, the characteristic of "gamma 1" is a standard characteristic 601, that of "gamma 2" is a characteristic which provides a contrast higher than "gamma 1", and that of "gamma 3" is a characteristic which provides a contrast lower than "gamma 1".

When a desired contrast is obtained, the photographer presses the set button 808 to update the parameter setting value to the current gamma characteristic table by the signal 237e. At this time, digital development processing is performed again using this parameter, and the image file 210 of the development result is sent to and stored in the second memory 212, and displayed on the display unit 211.

By repeating this operation, the photographer confirms an image of a desired contrast on the image 1402 played back on the display 1401, and then presses the recording instruction switch 805 in FIG. 8. In response to this, the recording instruction unit 213 outputs the recording instruction signal 214, and the image file stored in the second memory 212 is sent to the recording unit 217 and recorded on the recording medium.

In this way, an image of a contrast desired by the photographer can be attained by recording an image which is developed again after changing the "standard" setting value of the parameter of the gamma characteristic table.

In the above description, development is executed again by selecting a target one of gamma characteristic tables with the cross keys 809 and 812 and changing the parameter. Alternatively, images of redevelopment results may be sequentially displayed by performing development again on the basis of a gamma characteristic table changed every time either the cross key 809 or 812 is pressed.

Of image processes, an image process of switching the parameter setting value of the color gain correction unit 230 for multiplying the chrominance components Cr and Cb by the gain will be explained.

Figure 15:
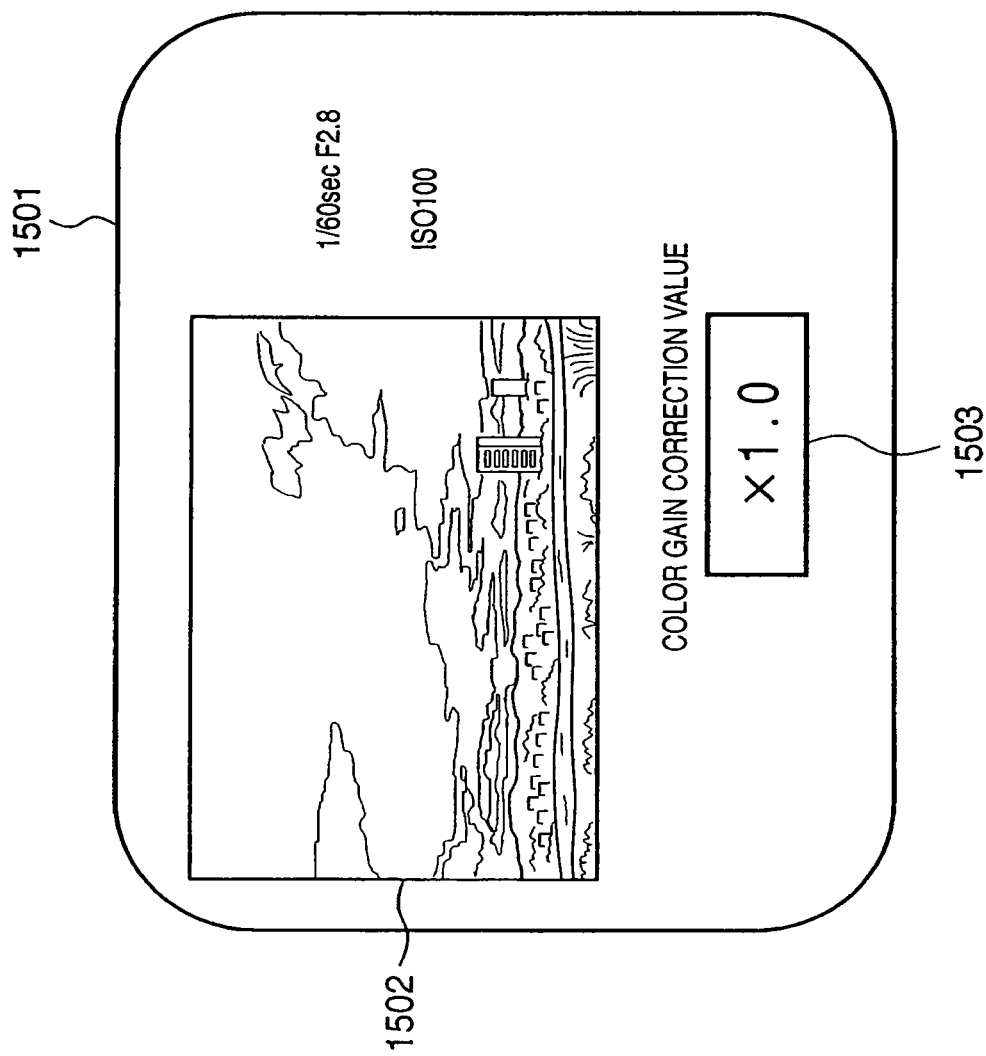
FIG. 15 is a view showing a display of the information display in FIG. 8 when the parameter of color gain correction is to be switched.

An image process of switching the parameter setting of color gain correction is selected from image processes in digital development processing by using the image process menu switch 813 and cross keys 809 to 812 in FIG. 8, and is determined by pressing the set button 808. Then, as shown in FIG. 15, a display 1501 displays an image 1502 of the result of the first digital development processing at "standard" setting values, and a gain value 1503 of level correction. The result of the first digital development processing is the result of photographing at a "standard" color gain of x1.0, and thus "x1.0" is displayed as shown in FIG. 15.

The display sequentially changes to "x1.2", "x1.4", . . . by pressing the cross key 809, and "x0.8", "x0.6", . . . by pressing the cross key 812. When a desired color gain value is displayed, the photographer presses the set button 808 to update the parameter setting value of the color gain correction unit 230 to the current color gain value by the signal 237f. At this time, digital development processing is performed again using this parameter, and the image file 210 of the development result is sent to and stored in the second memory 212, and displayed on the display unit 211.

By repeating this operation, the photographer confirms an image of a desired color density on the image 1502 played back on the display unit 211, and then presses the recording instruction switch 805 in FIG. 8. In response to this, the recording instruction unit 213 outputs the recording instruction signal 214, and the image file stored in the second memory 212 is sent to the recording unit 217 and recorded on the recording medium.

As a result, an image of an exposure desired by the photographer can be attained by recording an image which is developed again after changing the "standard" setting value of the parameter of color gain correction processing.

In the above description, development is executed again by setting a target gain value of color gain correction with the cross keys 809 and 812 and changing the parameter. Alternatively, images of redevelopment results may be sequentially displayed by performing development again at a gain value of color gain correction that is changed every time either the cross key 809 or 812 is pressed.

Of image processes, an image process of switching the parameter setting value of the hue adjustment unit 232 for rotating the hues of the chrominance components Cr and Cb will be explained.

Figure 16:
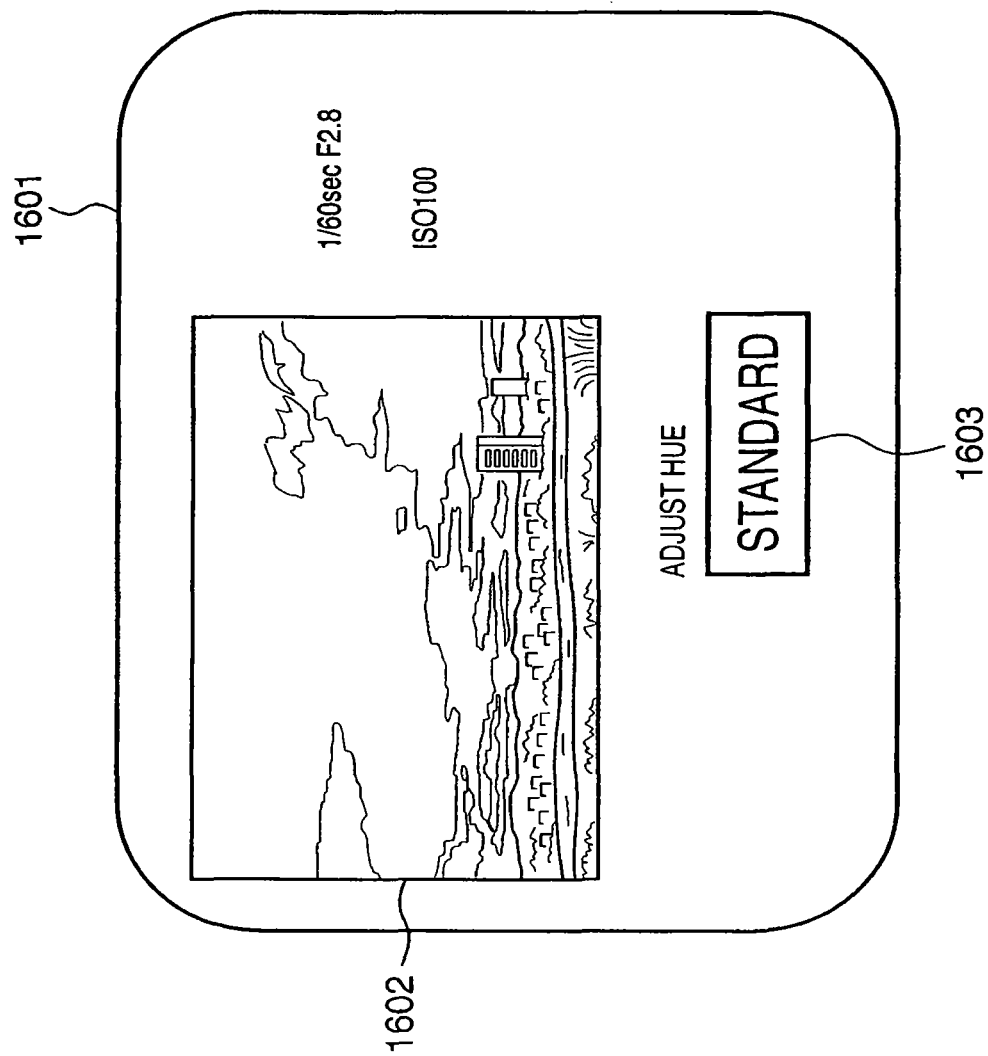
FIG. 16 is a view showing a display of the information display in FIG. 8 when the parameter of hue adjustment is to be switched.

An image process of switching the parameter setting of hue adjustment is selected from image processes in digital development processing by using the image process menu switch 813 and cross keys 809 to 812 in FIG. 8, and is determined by pressing the set button 808. Then, as shown in FIG. 16, a display 1601 displays an image 1602 of the result of the first digital development processing at "standard" setting values, and a hue adjustment table 1603. The result of the first digital development processing is the result of photographing by "standard" hue adjustment, and thus "standard" is displayed as shown in FIG. 16.

The display sequentially changes to "+1", "+2", . . . by pressing the cross key 809, and "−1", "−2", . . . by pressing the cross key 812. As each of the hue rotation tables, there is prepared a hue rotation table having 2×2 element values so as to change color reproduction in equation (B) described in the prior art. The 2×2 matrix of equation (B) is a matrix which gives a rotation angle θ on the CrCb color coordinate system, and the same rotation angle is set at the step of each table.

When a desired hue table is displayed, the photographer presses the set button 808 to update the parameter setting value of the hue adjustment unit 232 to the current hue rotation matrix by the signal 237g. At this time, digital development processing is performed again using this parameter, and the image file 210 of the development result is sent to and stored in the second memory 212, and displayed on the display unit 211.

By repeating this operation, the photographer confirms an image of a desired color reproduction on the image 1602 played back on the display unit 211, and then presses the recording instruction switch 805 in FIG. 8. In response to this, the recording instruction unit 213 outputs the recording instruction signal 214, and the image file stored in the second memory 212 is sent to the recording unit 217 and recorded on the recording medium.

In this manner, an image of a color reproduction desired by the photographer can be attained by recording an image which is developed again after changing the "standard" setting value of the parameter of hue adjustment processing.

In the above description, development is executed again by setting a target hue rotation table of hue adjustment with the cross keys 809 and 812 and changing the parameter. Alternatively, images of redevelopment results may be sequentially displayed by performing development again on the basis of a hue rotation table changed every time either the cross key 809 or 812 is pressed.

Of image processes, an image process of switching the parameter setting value of the edge enhancement unit 233 will be explained.

Figure 17:
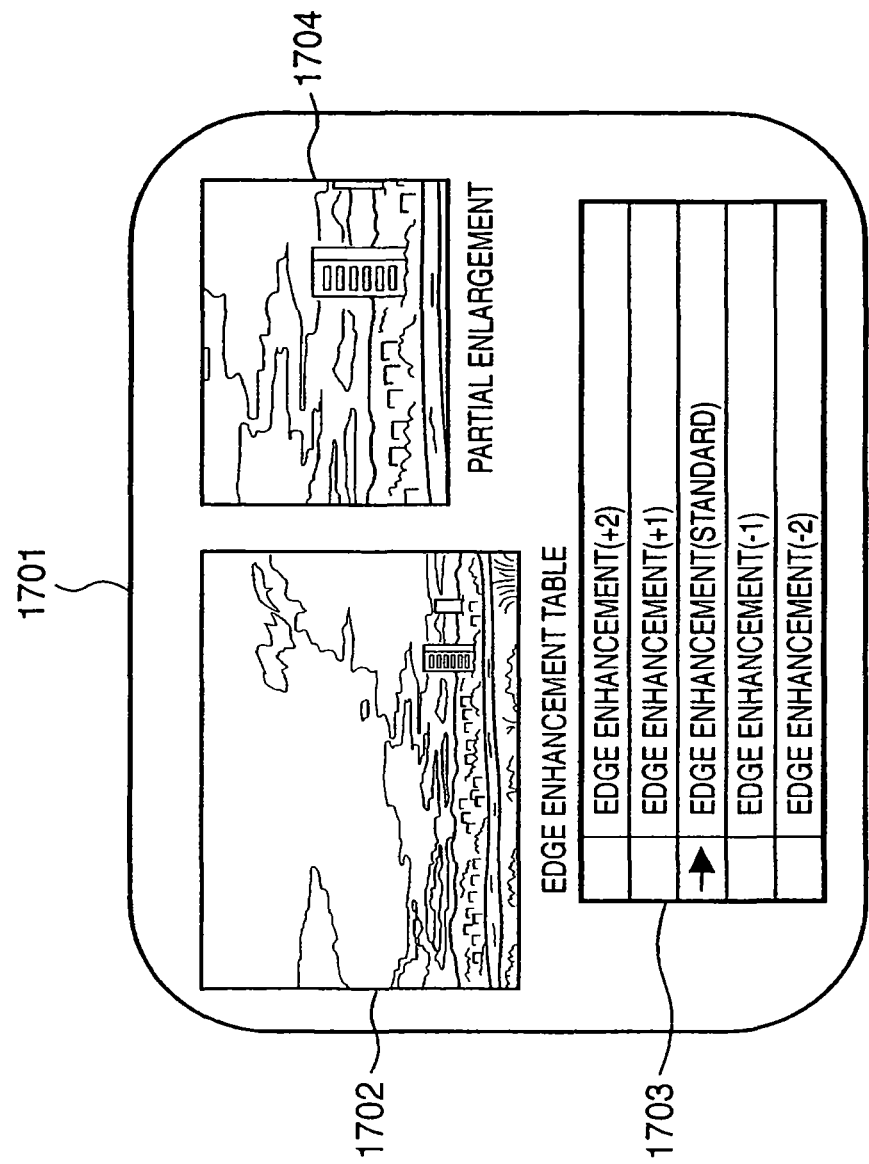
FIG. 17 is a view showing a display of the information display in FIG. 8 when the parameter of edge enhancement is to be switched.
Figure 19:
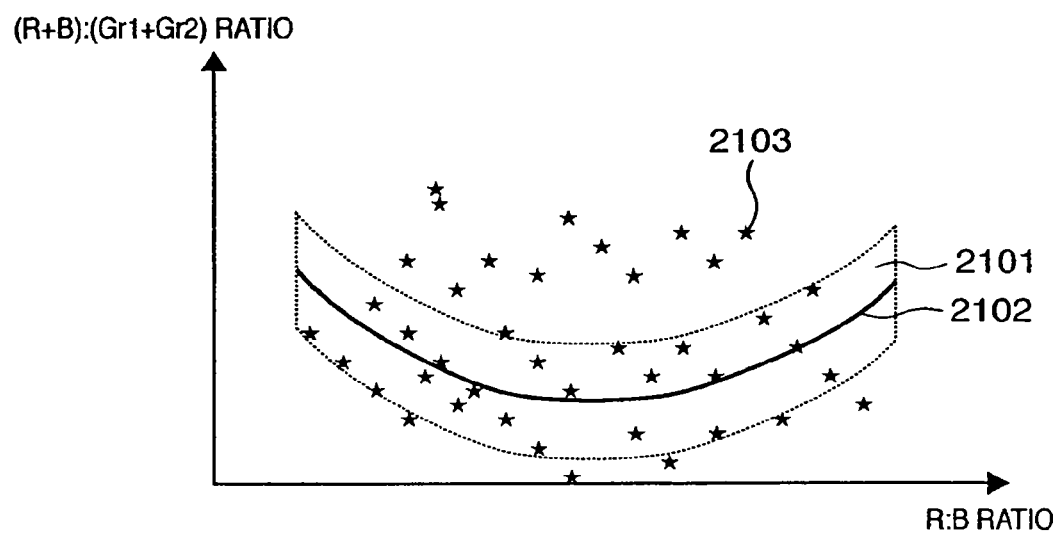
FIG. 19 is a graph showing the black body radiation locus or CIE day light locus and the achromatic region on the chromaticity coordinate system for obtaining the white balance.
Figure 22:
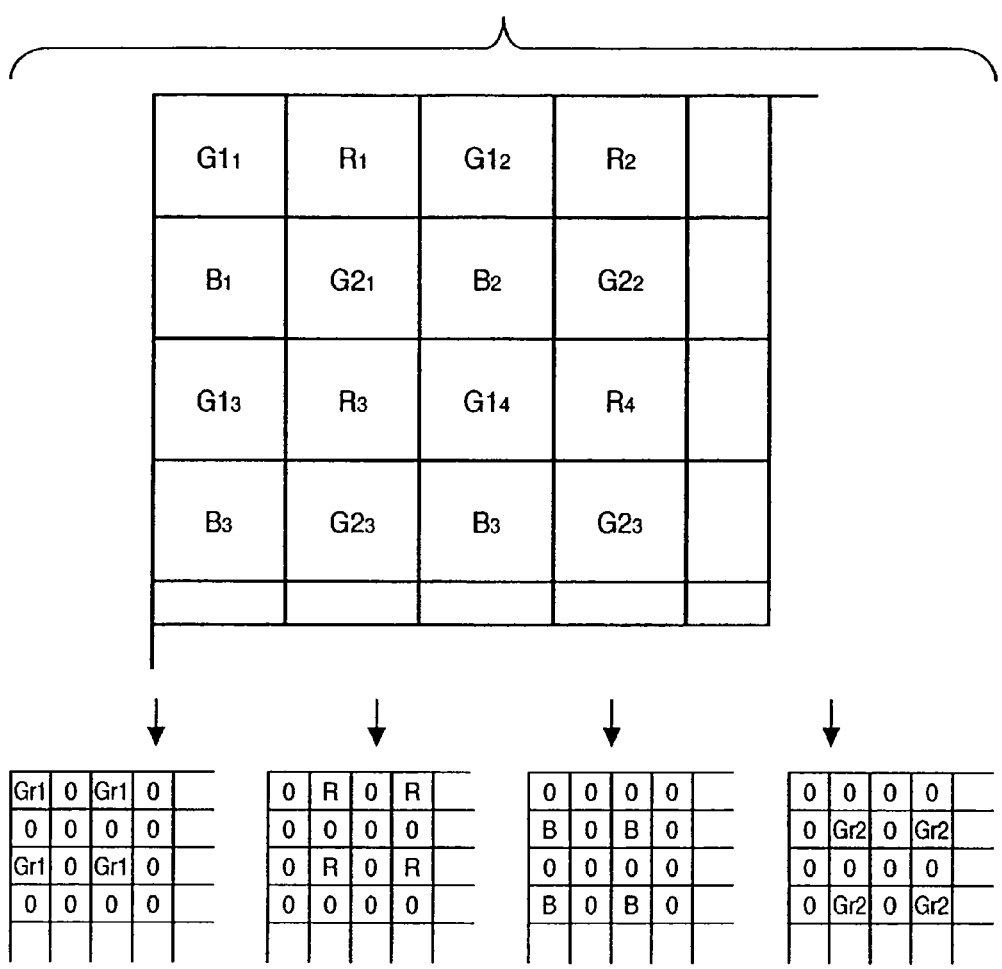
FIG. 22 is a view for explaining a process for each chrominance component of image data.

An image process of switching the parameter setting of edge enhancement is selected from image processes in digital development processing by using the image process menu switch 813 and cross keys 809 to 812 in FIG. 8, and is determined by pressing the set button 808. Then, as shown in FIG. 17, a display 1701 displays an image 1702 of the result of the first digital development processing at "standard" setting values, a partial enlarged image 1704 of the image, and an edge enhancement table 1703. The result of the first digital development processing is the result of photographing by "standard" edge enhancement, and thus "standard" is displayed as shown in FIG. 17. The display sequentially changes to "+1" and "+2" by pressing the cross key 809, and "−1" and "−2" by pressing the cross key 812. As each of the edge enhancement tables, a table which changes the degree of edge enhancement is prepared, as described in the prior art.

Similar to the prior art, a table capable of changing the degree of edge enhancement is configured by preparing sets of the numbers of adjacent pixels to be referred to for a pixel subjected to edge enhancement, the gain values of edge enhancement, and offset values serving as threshold levels used to detect an edge to be enhanced. In any table, the number of adjacent pixels to be referred to is set to eight.

For "standard", edge enhancement gain value: 1.0, offset value: 4.0

For "+1", edge enhancement gain value: 2.0, offset value: 2.0

For "+2", edge enhancement gain value: 3.0, offset value: 1.0

For "−1", edge enhancement gain value: 0.5, offset value: 4.0

For "−2 (edge enhancement OFF)", edge enhancement gain value: 0.0, offset value: arbitrary When a desired edge enhancement table is displayed, the photographer presses the set button 808 to update the parameter setting value of the edge enhancement unit 233 to the current edge enhancement table by the signal 237h. At this time, digital development processing is performed again using this parameter, and the image file 210 of the development result is sent to and stored in the second memory 212, and displayed on the display unit 211.

By repeating this operation, the photographer confirms an image of a desired sharpness on the images 1702 and 1704 played back on the display unit 211, and then presses the recording instruction switch 805 in FIG. 8. In response to this, the recording instruction unit 213 outputs the recording instruction signal 214, and the image file stored in the second memory 212 is sent to the recording unit 217 and recorded on the recording medium.

Accordingly, an image of a sharpness desired by the photographer can be attained by recording an image which is developed again after changing the "standard" setting value of the parameter of edge enhancement processing.

In the above description, development is executed again by setting a target table of edge enhancement with the cross keys 809 and 812 and changing the parameter. Alternatively, images of redevelopment results may be sequentially displayed by performing development again on the basis of an edge enhancement table changed every time either the cross key 809 or 812 is pressed.

The numerical value can also be switched individually for the number of adjacent pixels to be referred to in edge enhancement, the edge enhancement gain value, and the offset value.

With this operation, even if an image of an image quality which does not reflect the intention of the photographer is photographed due to a change in photographing conditions during photographing, the development parameter can be switched and set again to perform digital development processing. Whether the set parameter is optimal can be easily confirmed, photographing need not be repeated, and an optimal photographing result can always be implemented without missing a photographing scene intended by the photographer.

As described above, according to the first and second embodiments, photographing data from the image sensor is temporarily stored in the memory, and the image of the photographing data as the result of digital development processing is displayed. When the parameters of various image processes in digital development processing are not proper for the photographed image, the parameter settings are corrected again, and digital development processing is done again by reading out photographing data from the memory, implementing a photographed image of an image quality intended by the photographer. A photographing scene intended by the photographer is not missed, and an optimal photographing result can always be implemented.

As has been described above, according to the embodiments, a photographed image can undergo image processing which reflects the intention of the user without performing photographing again.

(Other Embodiment)

The object of the embodiments is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the present invention includes a case in which an OS (Operating System) or the like running on the computer performs some or all of actual processes on the basis of the instructions of the program codes and thereby realizes the functions of the above-described embodiments.

Furthermore, the present invention includes a case in which, after the program codes read out from the storage medium are written in the memory of a function expansion card inserted into the computer or the memory of a function expansion unit connected to the computer, the CPU of the function expansion card or function expansion unit performs some or all of actual processes on the basis of the instructions of the program codes and thereby realizes the functions of the above-described embodiments.

When the present invention is applied to the storage medium, the storage medium stores program codes corresponding to the above-described procedures.

The present invention is not limited to the above embodiments and various changes and modifications can be made within the spirit and scope of the present invention. Therefore, to apprise the public of the scope of the present invention the following claims are made.

Claim of Priority

This application claims priority from Japanese Patent Application No. 2004-177345 filed on Jun. 15, 2004, the entire contents of which are hereby incorporated by reference herein.

What is claimed is:

1. An image capturing apparatus comprising:
an image capturing unit that captures an object image;
a first storage unit that stores a second image signal generated by applying a predetermined processing to a first image signal output from said image capturing unit;
an image processing unit that generates a third image signal by applying a white balance processing to the second image signal based on a predetermined white balance control value of RGB;
a display unit that displays the third image signal and a chromaticity coordinate system having a coordinate axis which indicates a direction different from a coordinate axis along a black body radiation locus or a day light locus;
a second storage unit that stores the third image signal;
a change unit that changes the predetermined white balance control value of RGB used in said image processing unit;
a recording instruction unit that instructs to read out the third image signal from said second storage unit and to record the third image signal to a recording medium;
wherein said display unit displays a chromaticity coordinate point corresponding to the predetermined white balance control value of RGB used for generating the third image signal, and a chromaticity coordinate point corresponding to a white balance control value of RGB which is changed by said change unit and is to be used for the white balance processing of the second image signal, and the chromaticity coordinate system includes an axis which indicates a color temperature direction, an axis which indicates a green direction and a magenta direction, and both axes are displayed running at right angles to one another, and
wherein said display unit simultaneously displays said chromaticity coordinate point corresponding to the predetermined white balance control value of RGB used for generating the third image signal, and said chromaticity coordinate point corresponding to said white balance control value of RGB which is changed by said change unit and is to be used for the white balance processing of the second image signal.

2. The apparatus according to claim 1, wherein the chromaticity coordinate point corresponding to the predetermined white balance control value of RGB used for generating the third image signal which is displayed by said display unit is a point set as a white point in the chromaticity coordinate system, and said change unit determines a change amount of the predetermined white balance control value of RGB in accordance with user's operation value from the set point.

3. The apparatus according to claim 1, wherein the chromaticity coordinate system includes an axis which intersects a black body radiation locus or a day light locus.

4. The apparatus according to claim 1, wherein the change unit changes the predetermined white balance control value of RGB in a case that a development processing for an image signal is performed.

5. A control method for an image capturing apparatus comprising:
a first storage step of storing a second image signal generated by applying a predetermined processing to a first image signal output from an image capturing unit that captures an object image to a first storage unit;
an image processing step of generating a third image signal by applying a white balance processing to the second image signal based on a predetermined white balance control value of RGB;
a display step of displaying the third image signal and a chromaticity coordinate system having a coordinate axis which indicates a direction different from a coordinate axis along a black body radiation locus or a day light locus on a display unit;
a second storage step of storing the third image signal to a second storage unit;
a change step of changing the predetermined white balance control value of RGB used in said image processing step;
a recording instruction step of instructing to read out the third image signal from the second storage unit and to record the third image signal to a recording medium,
wherein said display step displays a chromaticity coordinate point corresponding to the predetermined white balance control value of RGB used for generating the third image signal, and a chromaticity coordinate point corresponding to a white balance control value of RGB which is changed in said change step and is to be used for the white balance processing of the second image signal, and the chromaticity coordinate system includes an axis which indicates a color temperature direction, an axis which indicates a green direction and a magenta direction, and both axes are displayed running at right angles to one another, and wherein said display unit simultaneously displays said chromaticity coordinate point corresponding to the predetermined white balance control value of RGB used for generating the third image signal, and said chromaticity coordinate point corresponding to said white balance control value of RGB which is changed in said change step and is to be used for the white balance processing of the second image signal.

6. A non-transitory storage medium storing a program which causes a computer to execute the control method according to claim 5.

* * * * *